US012211069B2

(12) United States Patent
Isgar

(10) Patent No.: US 12,211,069 B2
(45) Date of Patent: Jan. 28, 2025

(54) ROUTE ADVERTISEMENT AND ENTERTAINMENT SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 33 days.

(21) Appl. No.: 18/297,349

(22) Filed: Apr. 7, 2023

(65) Prior Publication Data
US 2023/0298070 A1  Sep. 21, 2023

Related U.S. Application Data

(63) Continuation-in-part of application No. 17/864,621, filed on Jul. 14, 2022, which is a continuation of application No. 16/297,857, filed on Mar. 11, 2019, now Pat. No. 11,392,988.

(60) Provisional application No. 62/640,840, filed on Mar. 9, 2018.

(51) Int. Cl.
| | |
|---|---|
| *G06Q 30/0251* | (2023.01) |
| *G07C 5/00* | (2006.01) |
| *H04W 4/021* | (2018.01) |
| *H04W 4/46* | (2018.01) |
| *H04W 4/90* | (2018.01) |

(52) U.S. Cl.
CPC ........ *G06Q 30/0266* (2013.01); *G07C 5/008* (2013.01); *H04W 4/021* (2013.01); *H04W 4/46* (2018.02); *H04W 4/90* (2018.02)

(58) Field of Classification Search
CPC ... G06Q 30/0266; G07C 5/008; H04W 4/021; H04W 4/46; H04W 4/90
See application file for complete search history.

(56) References Cited

U.S. PATENT DOCUMENTS

| | | | |
|---|---|---|---|
| 6,236,652 B1 | 5/2001 | Preston | |
| 9,445,396 B1* | 9/2016 | Herring | H04W 68/04 |
| 11,580,575 B1* | 2/2023 | Mirdha | G07C 9/00896 |
| 2006/0270421 A1 | 11/2006 | Phillips | |
| 2008/0140479 A1 | 6/2008 | Mello | |
| 2010/0023372 A1* | 1/2010 | Gonzalez | G06Q 30/0237 |
| | | | 705/14.62 |

(Continued)

OTHER PUBLICATIONS

Isgar, Route Advertisement and Entertainment System, Patent Cooperation Treaty Application Serial No. PCT/US24/23553, International Filing Date Apr. 8, 2024, International Search Report and Written Opinion dated Jul. 12, 2024.

*Primary Examiner* — An T Nguyen
(74) *Attorney, Agent, or Firm* — Schmeiser, Olsen & Watts LLP

(57) ABSTRACT

Described is a route advertisement/entertainment system for use in a ride share vehicle. The system includes a smart system having a server and business computing device located within a ride share vehicle. The system operates to provide targeted advertisement content and/or entertainment content to the business computing device. The targeted advertisement content and/or entertainment content may be based on the user content preferences stored in the server as part of the ride share user data of the user. Further, the targeted advertisement content and/or entertainment content may be based on the destination. Video, games, information and advertisement may be sent to the business computing device targeted for the passenger, based on content preferences and/or destination, during travel to the destination.

10 Claims, 39 Drawing Sheets

(56) References Cited

U.S. PATENT DOCUMENTS

| | | |
|---|---|---|
| 2010/0042285 A1 | 2/2010 | Abernethy |
| 2010/0138302 A1 | 6/2010 | Park |
| 2011/0040626 A1* | 2/2011 | Lin .................... G01C 21/3697 |
| | | 705/14.63 |
| 2011/0055005 A1 | 3/2011 | Lang |
| 2012/0054028 A1 | 3/2012 | Tengler |
| 2012/0191537 A1* | 7/2012 | O'Sullivan ........ G01C 21/3484 |
| | | 705/14.49 |
| 2014/0316900 A1 | 10/2014 | Amla |
| 2015/0248703 A1 | 9/2015 | Strode |
| 2015/0371270 A1 | 12/2015 | Mcdevitt et al. |
| 2016/0042401 A1 | 2/2016 | Menendez |
| 2017/0255961 A1* | 9/2017 | Parekh ............... G06Q 30/0261 |
| 2019/0034967 A1 | 1/2019 | Ferguson et al. |
| 2019/0135109 A1 | 5/2019 | Miller, Jr. et al. |
| 2019/0140883 A1* | 5/2019 | Greenberger ......... H04L 51/224 |
| 2019/0222885 A1 | 7/2019 | Cho et al. |
| 2019/0251600 A1* | 8/2019 | Cabrera ................ H04W 4/021 |
| 2021/0081994 A1* | 3/2021 | Newell .............. G01C 21/3453 |
| 2022/0076297 A1* | 3/2022 | Isgar .................. G06Q 30/0273 |
| 2022/0148035 A1 | 5/2022 | Kwatra et al. |
| 2022/0224963 A1 | 7/2022 | Herz et al. |
| 2023/0047697 A1 | 2/2023 | Cella |
| 2023/0143472 A1* | 5/2023 | Newell .............. G01C 21/3697 |
| | | 705/14.62 |

\* cited by examiner

ROUTE ADVERTISEMENT AND ENTERTAINMENT SYSTEM

CROSS REFERENCE TO RELATED APPLICATION[S]

This application is a continuation-in-part of U.S. patent application Ser. No. 17/864,621, filed on Jul. 14, 2022, which is a continuation of U.S. patent application Ser. No. 16/297,857, filed on Mar. 11, 2019, now U.S. Pat. No. 11,392,988, issued Jul. 19, 2022, which claims priority to U.S. Provisional Patent Application Ser. No. 62/640,840, filed Mar. 9, 2018, the disclosures of which are hereby incorporated entirely herein by reference.

BACKGROUND OF THE INVENTION

Technical Field

This invention relates to advertisements and entertainment in a vehicle, and specifically to a system for providing targeted advertisements and/or entertainment within a ride share vehicle.

State of the Art

In large cities and the like, the utilization of ride share services to travel between locations is commonly utilized. This is particularly true in cities with very high density where driving is difficult and/or expensive or where parking is limited. It is common to utilize other forms of transportation. One very common form of transportation is ride share services. However, ride share services do not provide for advertisement and/or entertainment within the ride share vehicle.

Accordingly, there is a need in the field of ride share services to provide a system for targeted advertisement and/or entertainment to the passenger of the ride share service.

SUMMARY OF THE INVENTION

The disclosed invention relates to a route advertisement/entertainment system for use in a ride share vehicle, the system comprising: a server having a memory storing user data, user content preferences and advertisement/entertainment data; a business computing device located within a ride share vehicle, the business computing device coupled to the server, wherein the server is programmed to: receive a signal from a ride share driver device, the signal including user data of the passenger that has been picked up and an indication that a ride to a destination has been initiated; establish a connection with the business computing device in response to receiving the signal from the ride share driver device and send for display on the business computing device an interactive user interface with a request to engage with the system during travel to the destination; receive a signal from the business computing device indicating a positive acknowledgment to engage with system; in response to receiving the positive acknowledgment, automatically access and process user content preferences corresponding to the user data and send for display on the business computing device an interactive user interface with a request to view content corresponding to the user content preferences and/or the destination; and in response to receiving a positive acknowledgment to view the content, automatically send, for display on the business computing device, content from advertisement/entertainment data associated with the content corresponding to the user content preferences and the destination.

Another embodiment includes a route advertisement/entertainment system for use in a ride share vehicle, the system comprising: a server having a memory storing user data, user content preferences and advertisement/entertainment data, the advertisement/entertainment data being in a form of contest games information; a business computing device located within a ride share vehicle, the business computing device coupled to the server, wherein the server is programmed to: receive a signal from a ride share driver device, the signal including user data of the passenger that has been picked up and an indication that a ride to a destination has been initiated; establish a connection with the business computing device in response to receiving the signal from the ride share driver device and send for display on the business computing device an interactive user interface with a request to engage with the system to play a contest game during travel to the destination; receive a signal from the business computing device indicating a positive acknowledgment to engage with system to play the contest game; in response to receiving the positive acknowledgment, automatically access and process user content preferences corresponding to the user data and send for display on the business computing device an interactive user interface with a request to select one of a plurality of selectable game elements, each element corresponding to a different game; and in response to receiving a positive acknowledgment of selecting one of the selectable game elements, automatically send, for display on the business computing device, a game for play on the business computer device; and in response to passenger winning the game through the business computing device sending for display on the business computing device an acknowledgment of winning and automatically applying credits to the user, wherein credits are exchangeable for goods and/or services.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to system for providing targeted advertisements and/or entertainment within a ride share vehicle. The system may be an interactive system that engages the passenger/rider with a business computing device located within the ride share vehicle. The system may include the use of a mobile application operating on a business computing device that may be a mobile computing device like a smartphone, a tablet, a wearable, and the like; and/or the system may operate on any type of computing device as a downloadable application or even as a web application.

Figure 1:
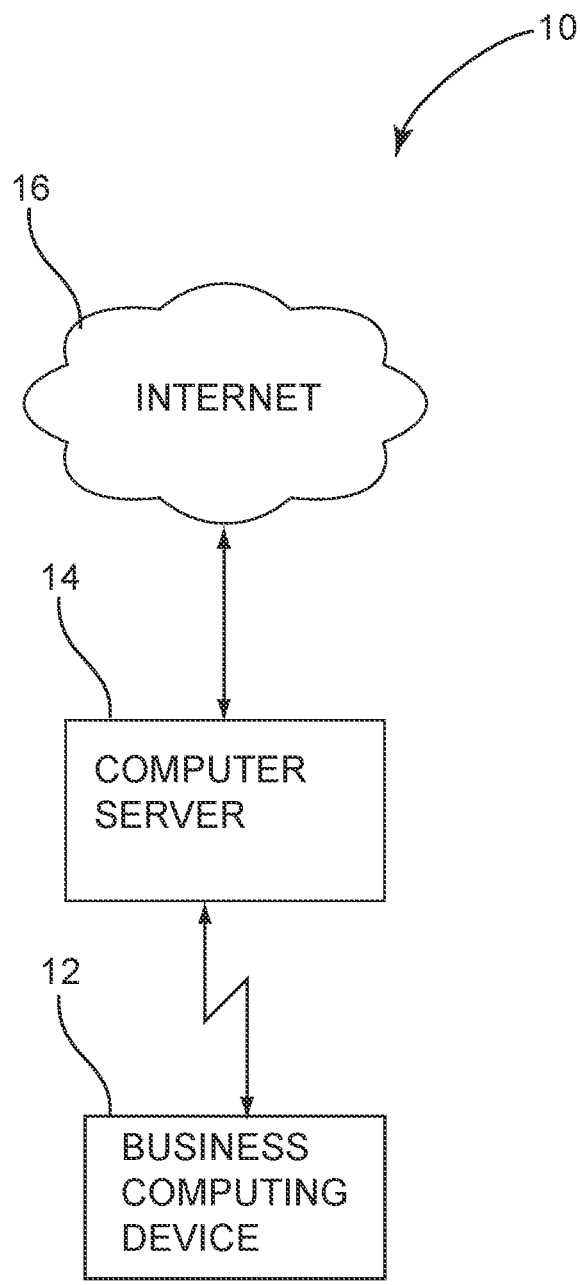
FIG. 1 shows a diagrammatic view of a route advertisement/entertainment system for a ride share vehicle according to an embodiment.

FIG. 1 depicts an embodiment of a route advertisement/entertainment system 10. The system 10 may include a business computing devices 12 that is coupled to a server 14. This coupling may be a network connection, such as a wireless connection, a Wi-Fi connection, a Bluetooth connection or the like, wherein the business computing device 12 may communicate with and receive communication from the server 14. The business computing device 12 may include a tablet, a smartphone, wearable devices and the like. The server 14, in some embodiments, may be a computer server or a cloud-based infrastructure architecture.

Figure 2:
FIG. 2 is a view of a user computing device operating a ride share app as part of a route advertisement/entertainment system for a ride share vehicle according to an embodiment.

The server 14 may include a memory storing user data and advertisement/entertainment data. The memory of the server 14 may store user data, such as a username, a password, and profile information associated with the user's ride share profile and may also store user content preferences of the user, such as entertainment preferences, interested subjects/topics and so forth. It may also store advertisement/entertainment data such as, but not limited to, entertainment content, advertisement content and so forth. An embodiment is shown in FIG. 2, wherein a user, utilizing a user computing device 20, operates a ride share app to enter content preferences. The content preferences may include various topics, such as, without limitation, news, sports, destination information, playing games, podcasts and the like.

The server 16 may be coupled to the Internet 16 through a network connection similar to those described above. The connection to the Internet 16 allows the server 14 to utilize the Internet 16 for obtaining information that may be utilized as part of the system 10.

Figure 3:
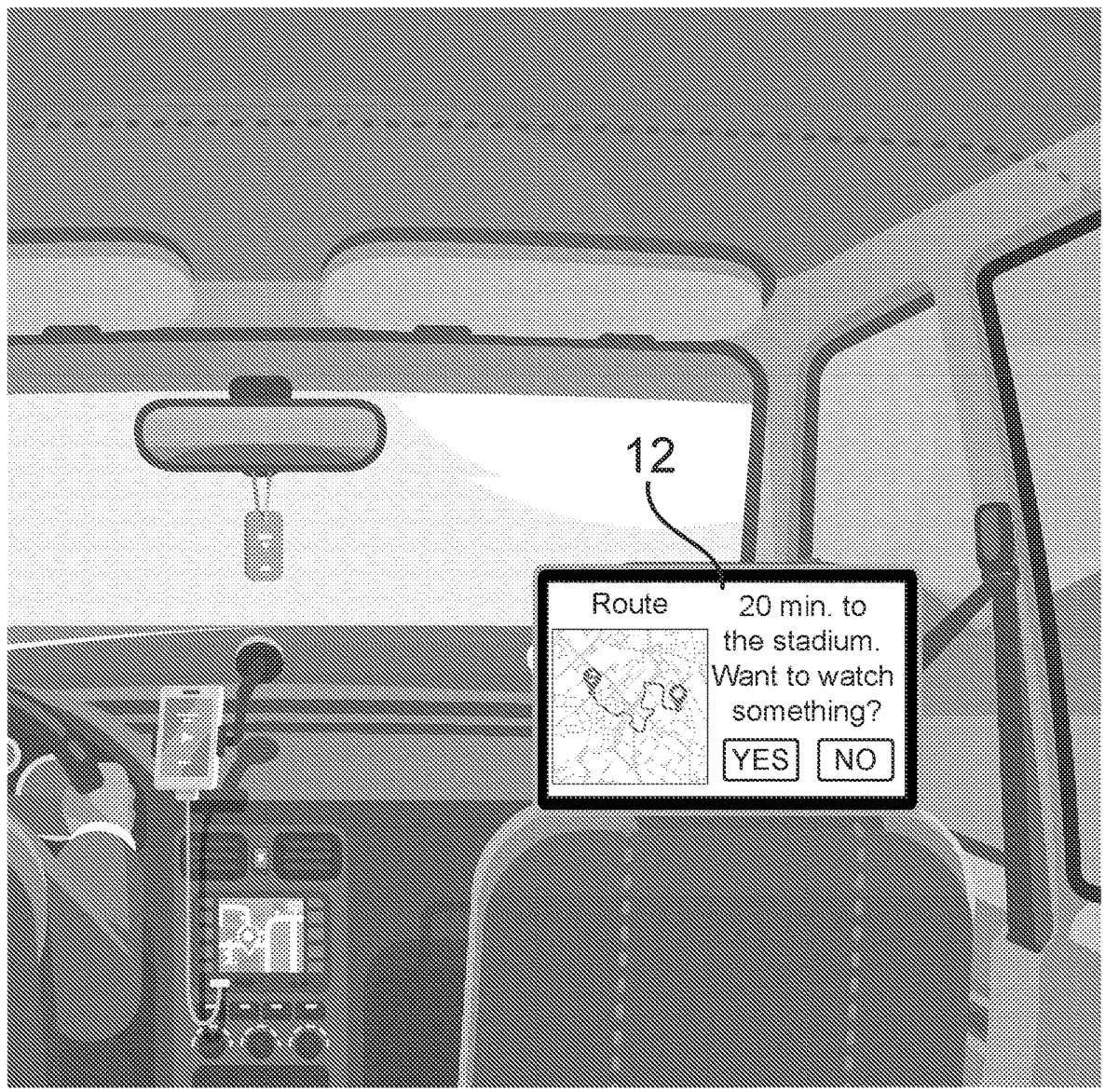
FIG. 3 is a perspective view of business computing device of a route advertisement/entertainment system for a ride share vehicle according to an embodiment.

Referring to FIGS. 3-16, the operation of the system 10 is depicted. A user may utilize a user computing device 20 operating a ride share app to request a ride and select a ride share driver operating a ride share vehicle. The system 10 may operate once the ride share vehicle picks up the user as a passenger. The server 14 may be programmed to receive a signal from a ride share driver device, the signal including user data of the passenger that has been picked up and an indication that a ride to a destination has been initiated. The server 14 may then establish a connection with the business computing device 12 in response to receiving the signal from the ride share driver device and send for display on the business computing device 12 an interactive user interface with a request to engage with the system 10 during travel to the destination, as shown in FIG. 3. The business computing device 12 in FIG. 3 depicts a route to the destination, displays the estimated time to the destination (i.e. 20 minutes to the stadium) and a request to the passenger if the passenger wishes to engage with the system 10. The passenger may then select "yes" (a positive acknowledgment) or "no" (a negative acknowledgment). If the user selects "yes", the business computing device 12 sends a signal that indicates a positive acknowledgment to the server 14.

Figure 4:
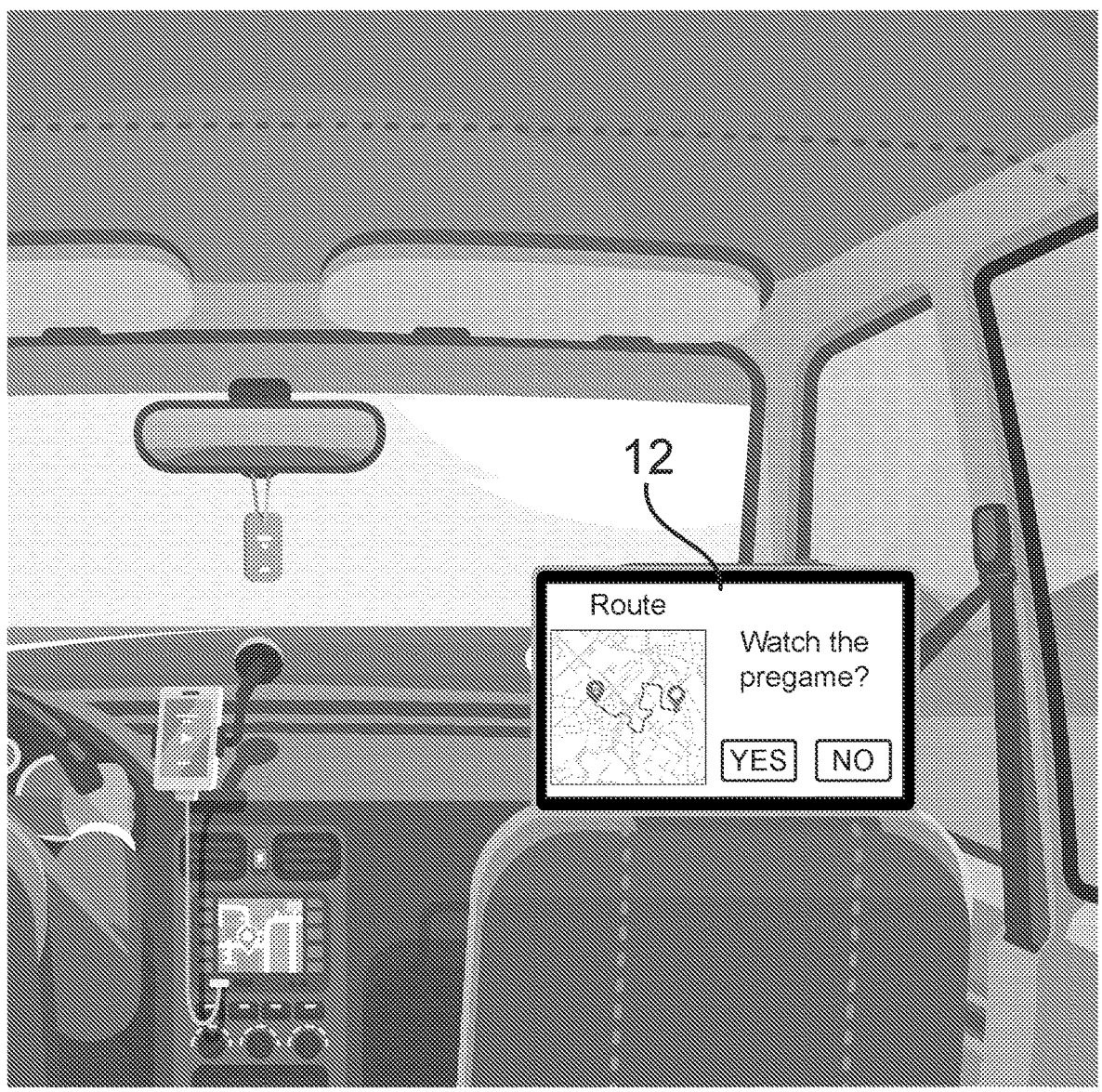
FIG. 4 is a perspective view of business computing device of a route advertisement/entertainment system for a ride share vehicle according to an embodiment.
Figure 5:
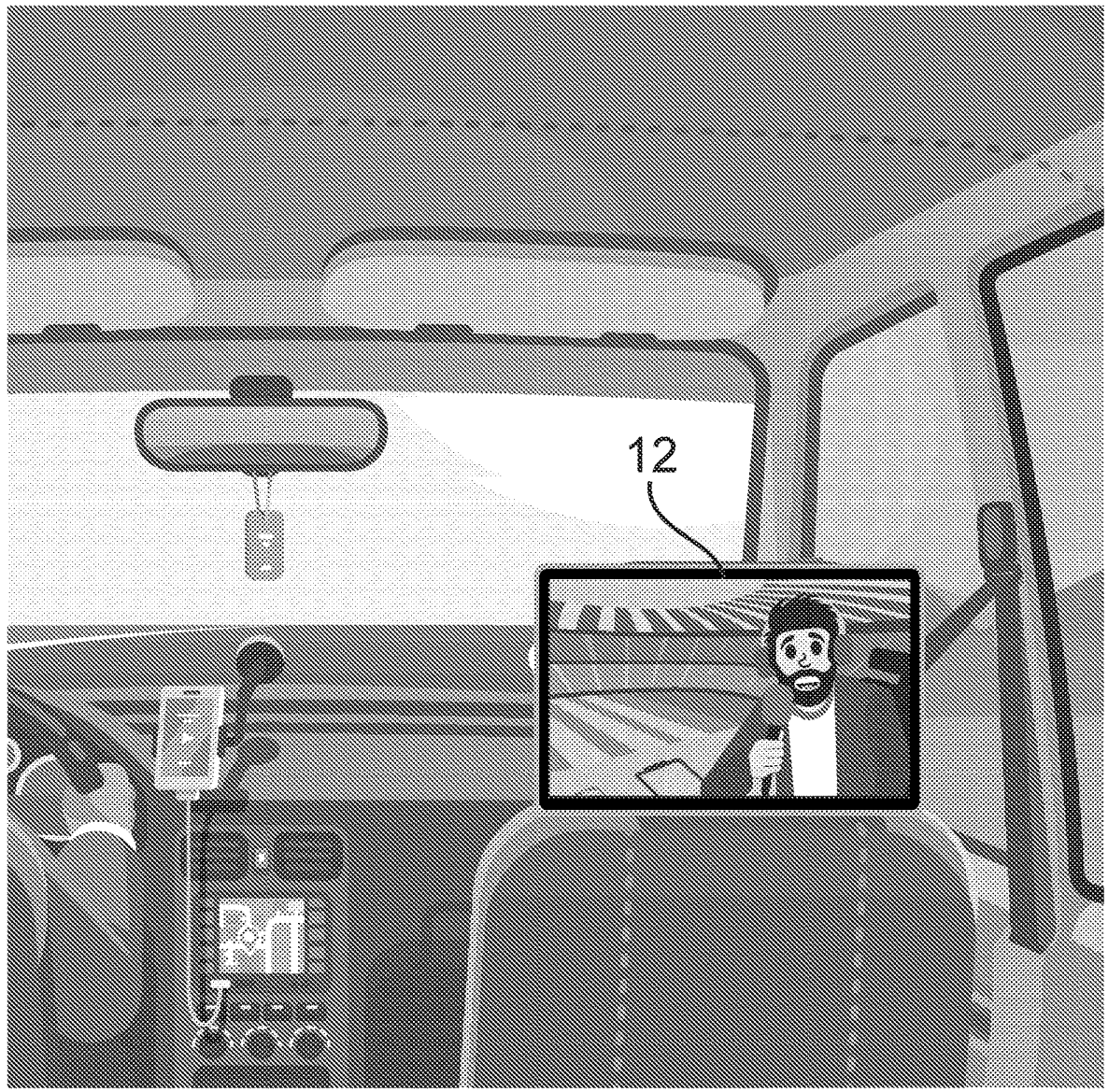
FIG. 5 is a perspective view of business computing device of a route advertisement/entertainment system for a ride share vehicle according to an embodiment.

The server 14 may be programmed to receive the signal from the business computing device 12 indicating a positive acknowledgment to engage with system 10, and, in response to receiving the positive acknowledgment, automatically access and process user content preferences corresponding to the user data and send for display on the business computing device 12 an interactive user interface with a request to view content corresponding to the user content preferences and/or the destination, as shown in FIG. 4. The business computing device 12 in FIG. 4 depicts the route, but may not need to depict the route, and also requests whether the passenger wishes to watch the pregame. This is an example of the server sending a request to watch content (pregame) based on the user content preferences (sports info) and destination (stadium). In at least this way, the advertisement/entertainment content is targeted to the passenger based on the passenger content preferences and destination. Then, in response to receiving a positive acknowledgment to view the content, the server 14 automatically sends, for display on the business computing device 12, content from advertisement/entertainment data associated with the content corresponding to the user content preferences and the destination, depicted in FIG. 5 as video of the pregame show for the game at the stadium (destination of the passenger).

Figure 6:
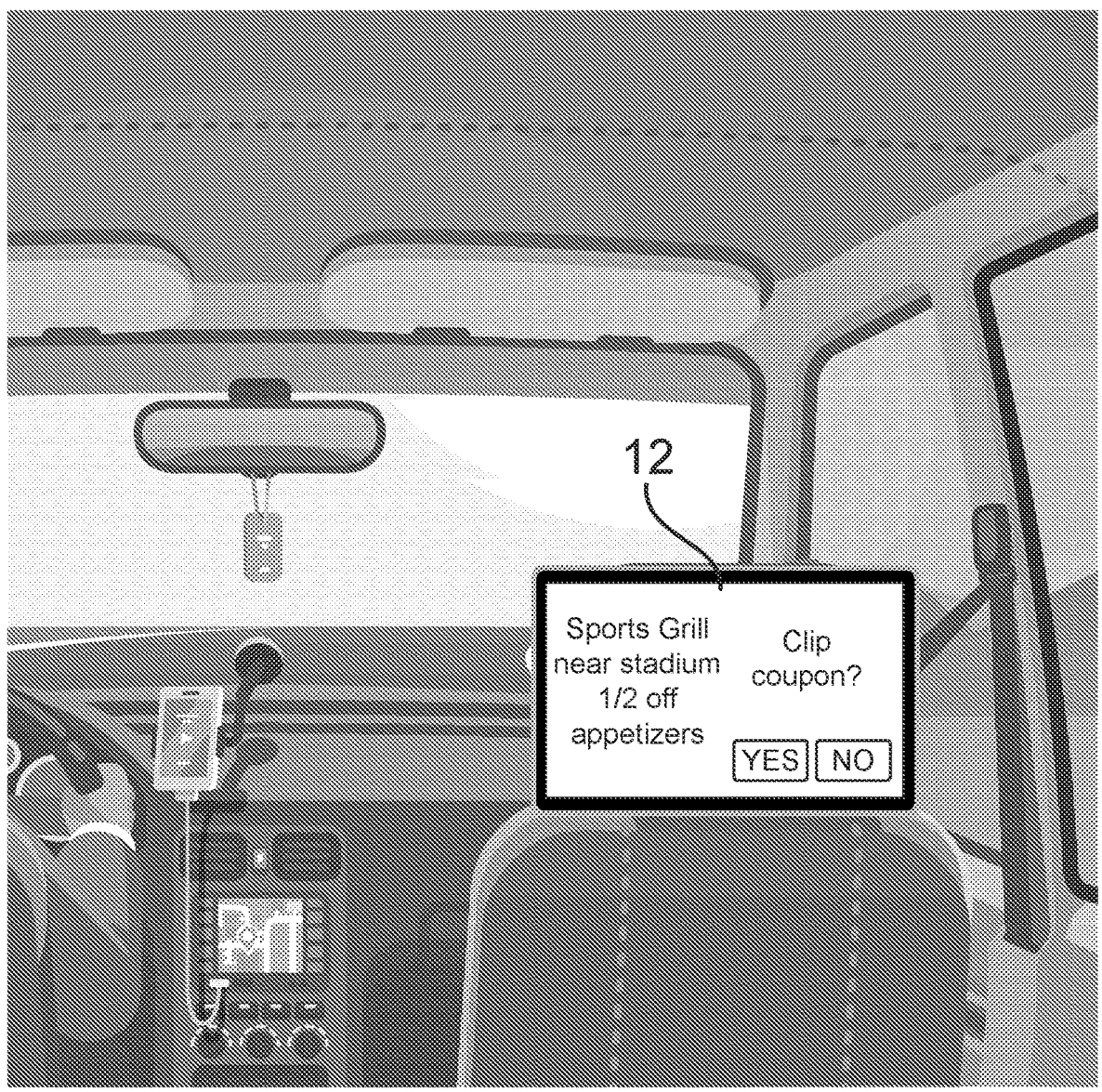
FIG. 6 is a perspective view of business computing device of a route advertisement/entertainment system for a ride share vehicle according to an embodiment.
Figure 7:
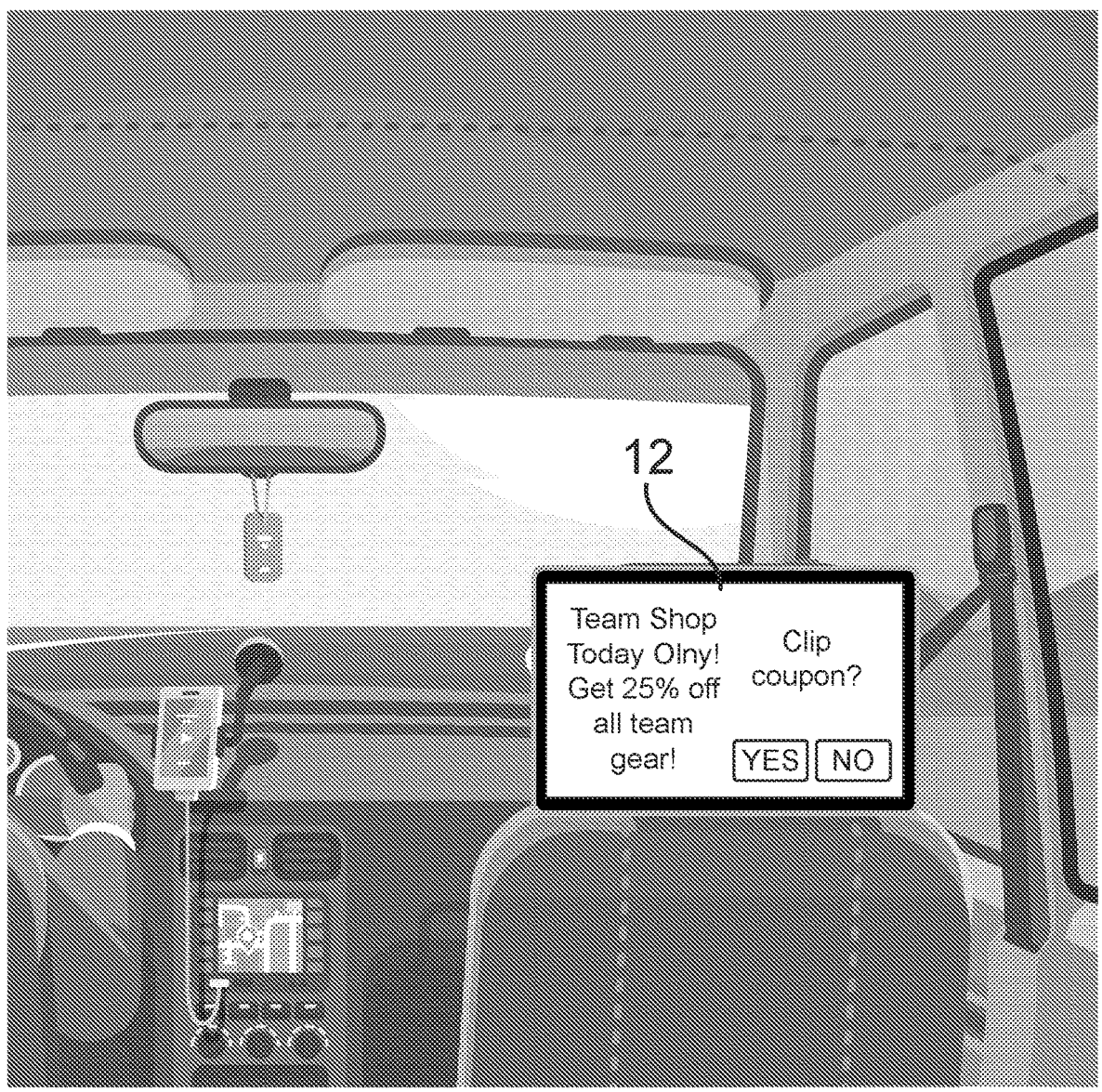
FIG. 7 is a perspective view of business computing device of a route advertisement/entertainment system for a ride share vehicle according to an embodiment.
Figure 8A:
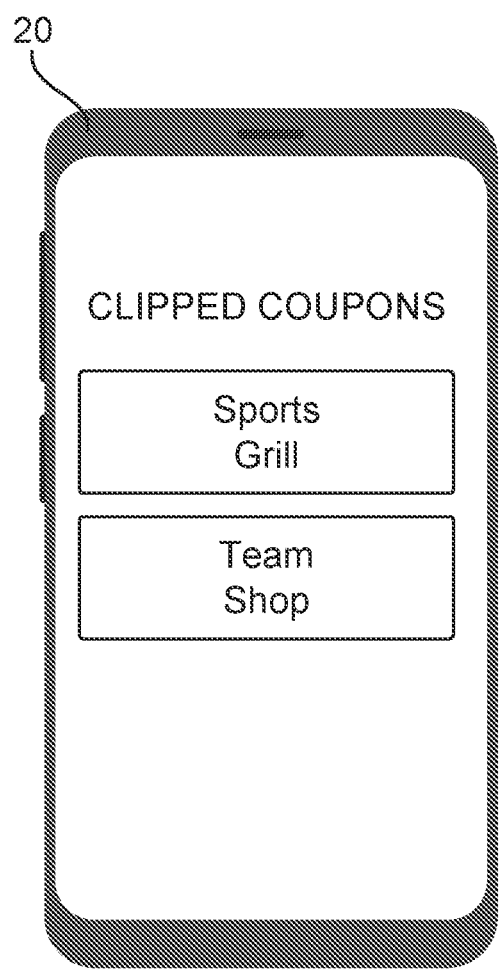
FIG. 8A is a view of a user computing device depicting coupons clipped from the business computing device as part of a route advertisement/entertainment system for a ride share vehicle according to an embodiment.
Figure 8B:
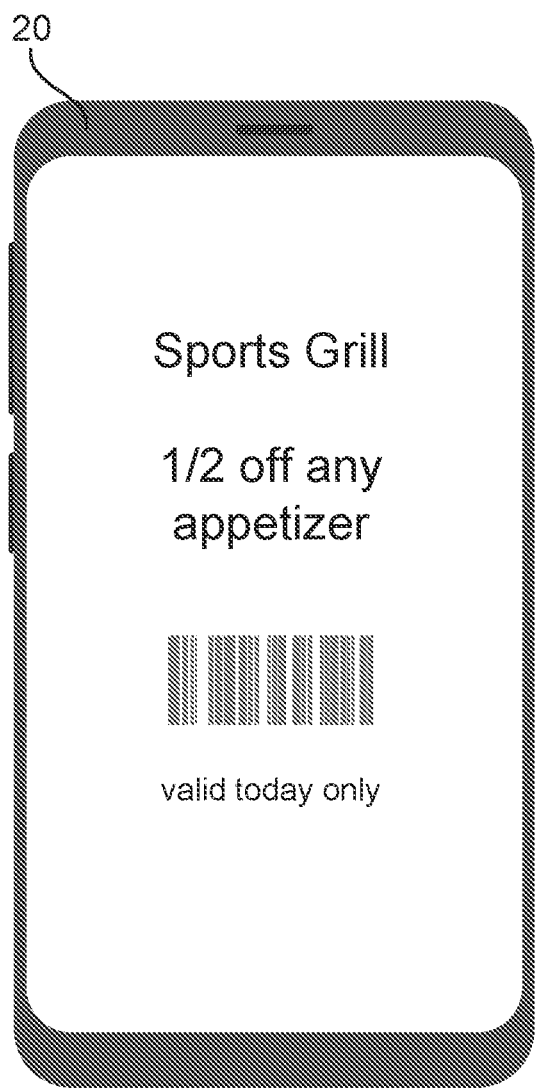
FIG. 8B is a view of a user computing device depicting coupons clipped from the business computing device as part of a route advertisement/entertainment system for a ride share vehicle according to an embodiment.

As shown in FIGS. 6 and 7, the advertisement/entertainment data sent to the business computing device 12 for display from the server 14 may be an advertisement for a business near the destination. For example, in FIG. 6, as the passenger is going to the stadium, the targeted advertisement may be for food near the stadium in the form of an advertisement for a Sports Grill with a coupon associated with the business. The same is shown in FIG. 7, but an advertisement and coupon for the Team Shop as the stadium. The passenger may select to clip coupon or to save the coupon in some fashion. This places the coupons in the user data for the ride share app and profile of the passenger. As shown in FIGS. 8A and 8B, the coupons that are clipped or other wise stored using the business computing device 12 of the system 10 are accessible on the user computing device. There may be a database stored of coupons as shown in FIG. 8A. The selection of the coupon in FIG. 8A may then depict a bar code and the terms of the coupon as shown in FIG. 8B. In another embodiment, shown in FIG. 14, the advertisement and coupons may be for national or large brands or businesses that are targeted to the passenger based on the user content preferences of the passenger.

Figure 9:
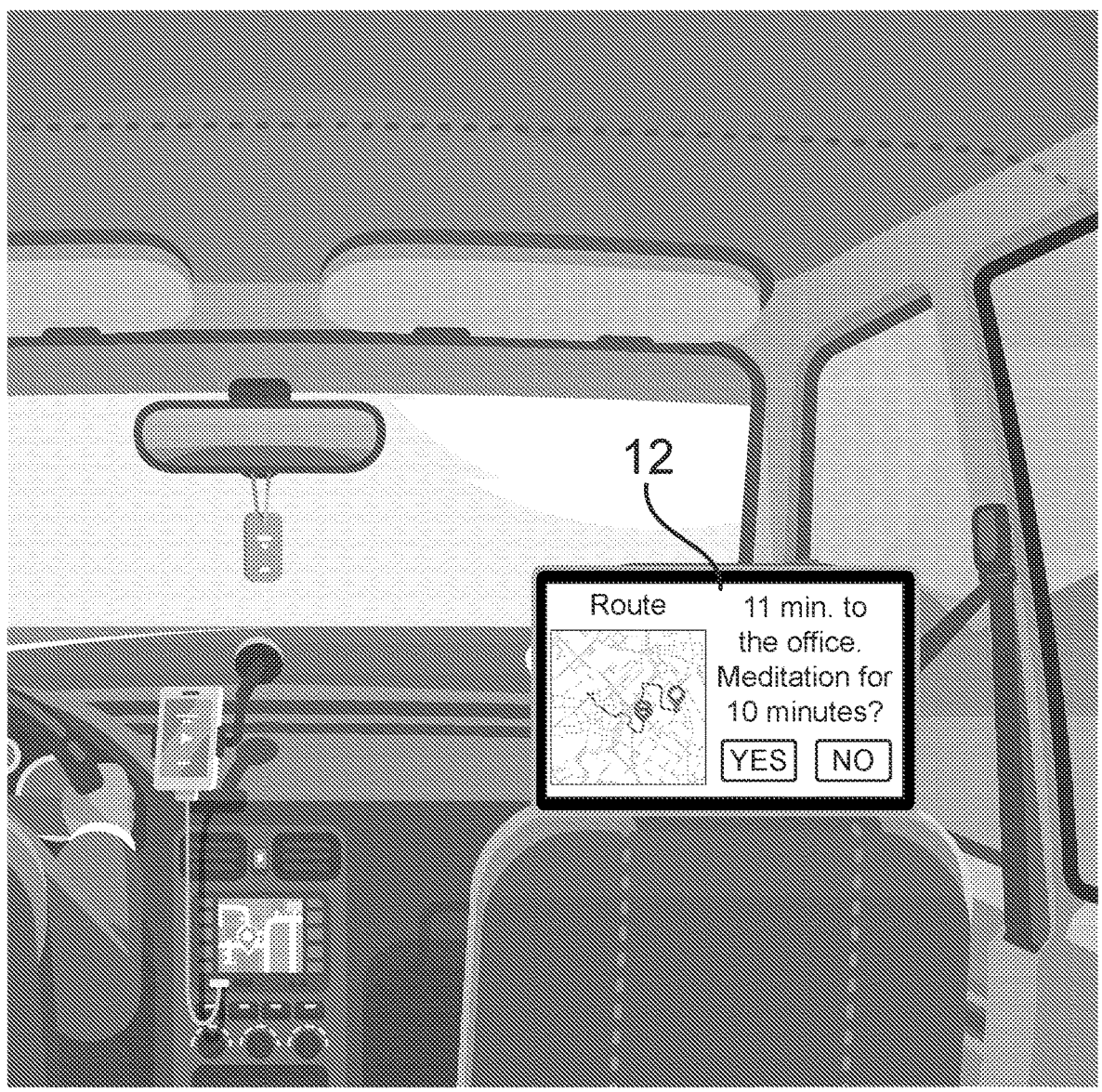
FIG. 9 is a perspective view of business computing device of a route advertisement/entertainment system for a ride share vehicle according to an embodiment.
Figure 10:
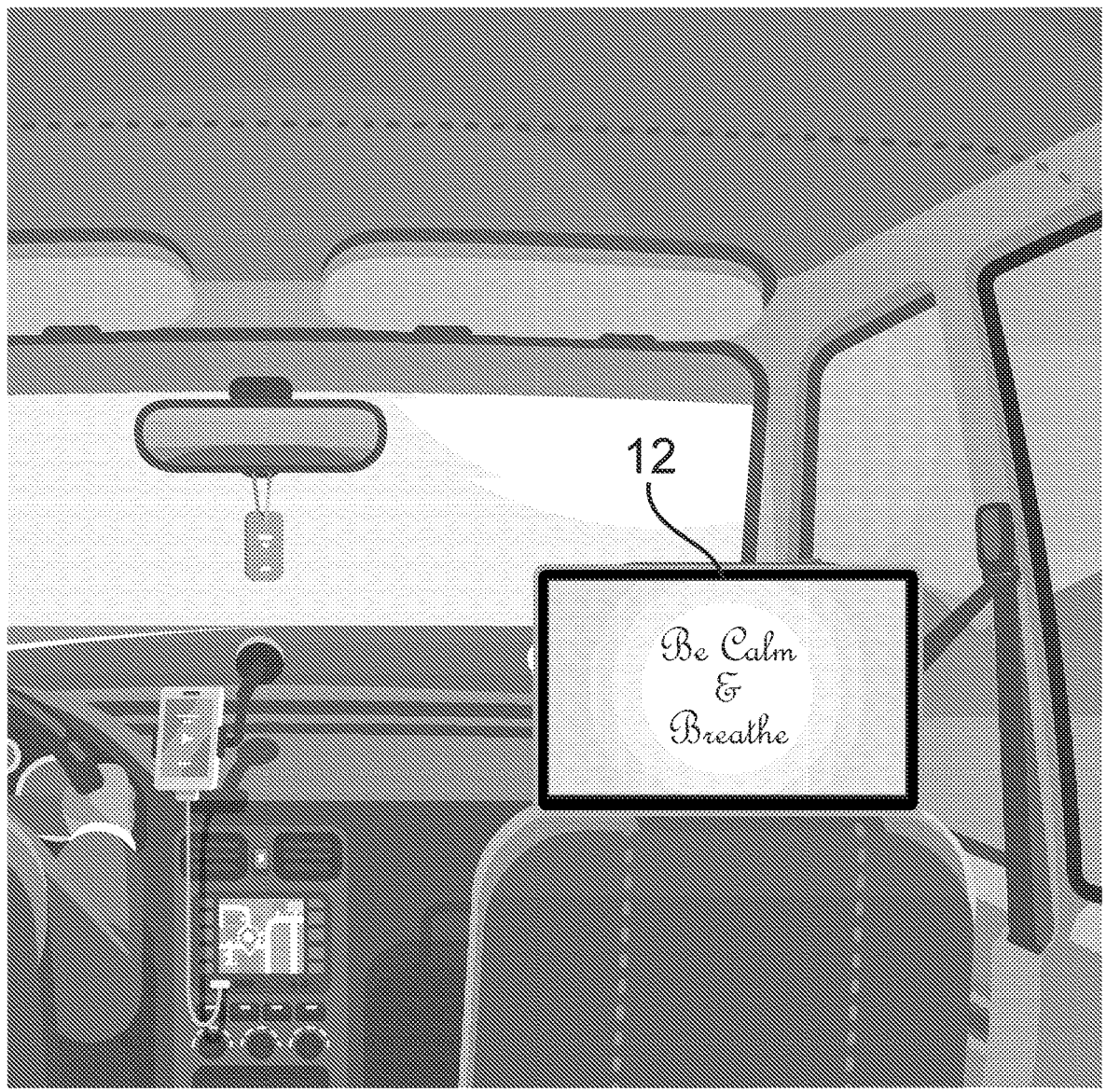
FIG. 10 is a perspective view of business computing device of a route advertisement/entertainment system for a ride share vehicle according to an embodiment.

In another example of operation of the system 10 is depicted in FIGS. 9 and 10. In response to receiving the positive acknowledgment, automatically access and process user content preferences corresponding to the user data and send for display on the business computing device 12 an interactive user interface with a request to view content corresponding to the user content preferences and/or the destination, as shown in FIG. 9. The business computing device 12 in FIG. 9 depicts the route, but may not need to depict the route, and also requests whether the passenger wishes to meditate on the trip to the office. This is an example of the server sending a request to watch content (meditation) based on the user content preferences (work/business) and destination (office) in the form of time. In this example, the server may send a request for content base on the estimated time to reach the destination, an example of which is shown in FIG. 9 with the request of "Meditation for 10 minutes?" when the destination is an estimated 11 minutes away. In at least this way, the advertisement/entertainment content is targeted to the passenger based on the passenger content preferences and destination. Then, in response to receiving a positive acknowledgment to view the content, the server 14 automatically sends, for display on the business computing device 12, content from advertisement/entertainment data associated with the content corresponding to the user content preferences and the destination, depicted in FIG. 10 as video or other graphical visual interface imploring the passenger to mediate.

Figure 11:
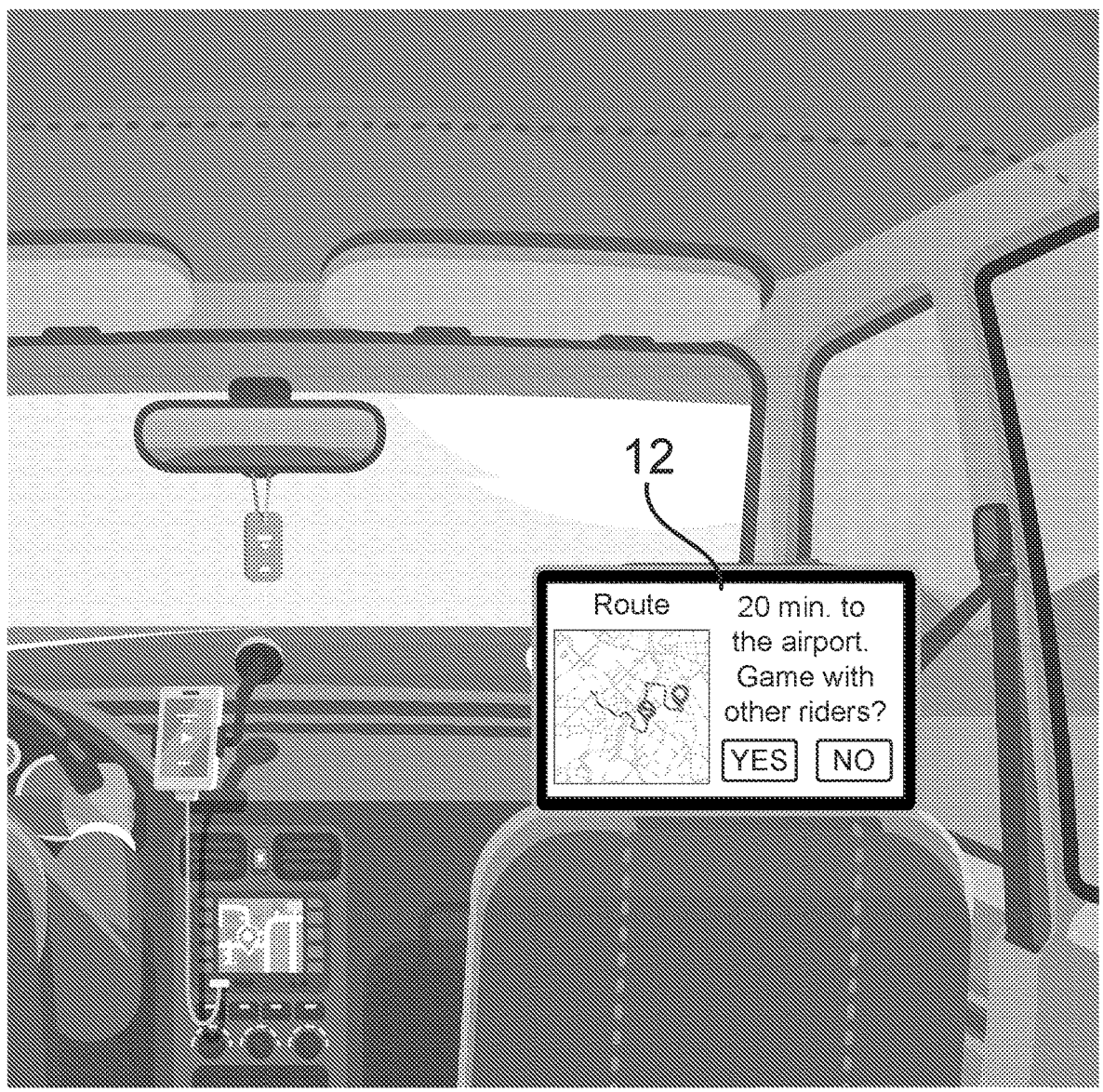
FIG. 11 is a perspective view of business computing device of a route advertisement/entertainment system for a ride share vehicle according to an embodiment.
Figure 12:
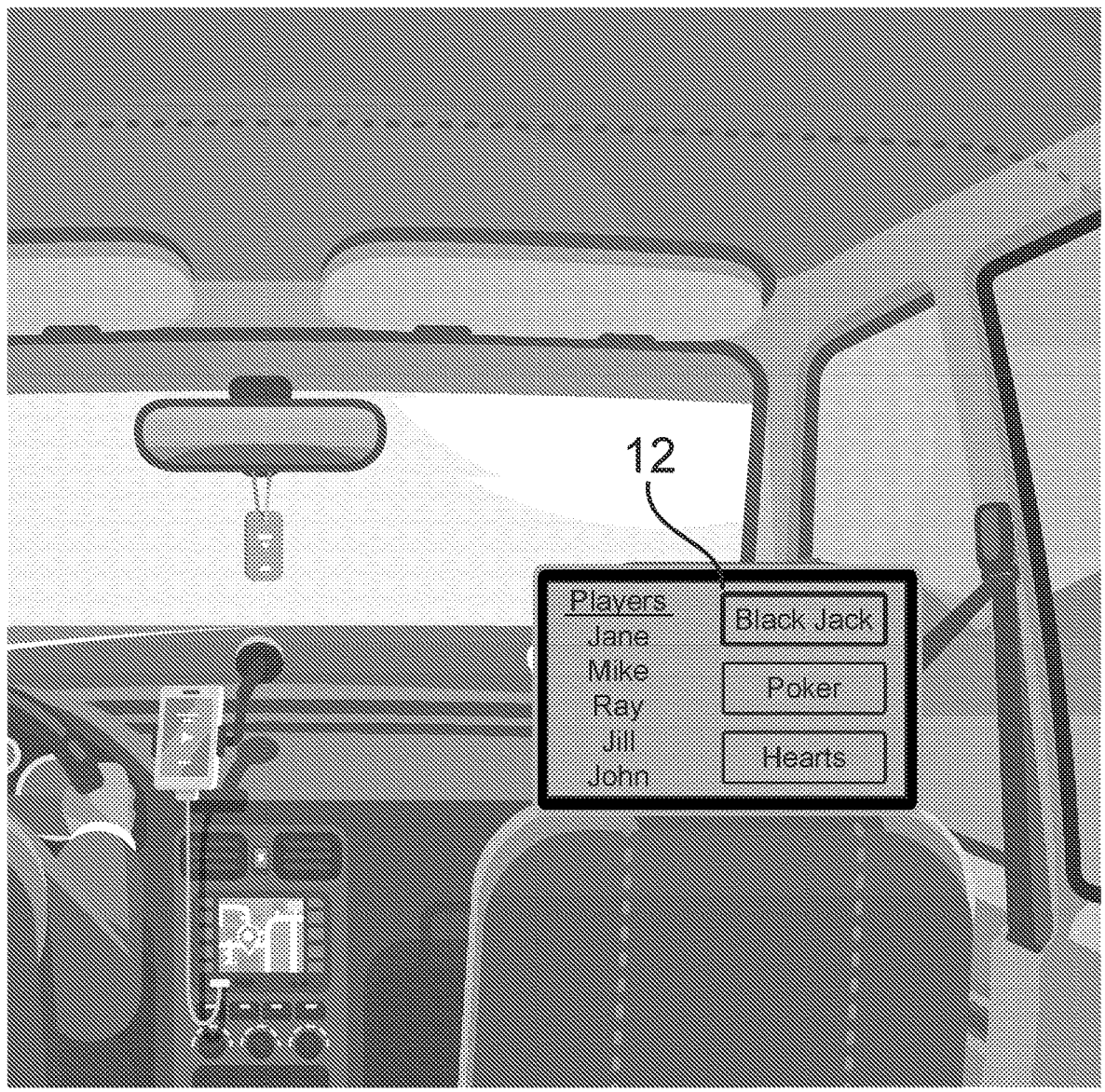
FIG. 12 is a perspective view of business computing device of a route advertisement/entertainment system for a ride share vehicle according to an embodiment.
Figure 13:
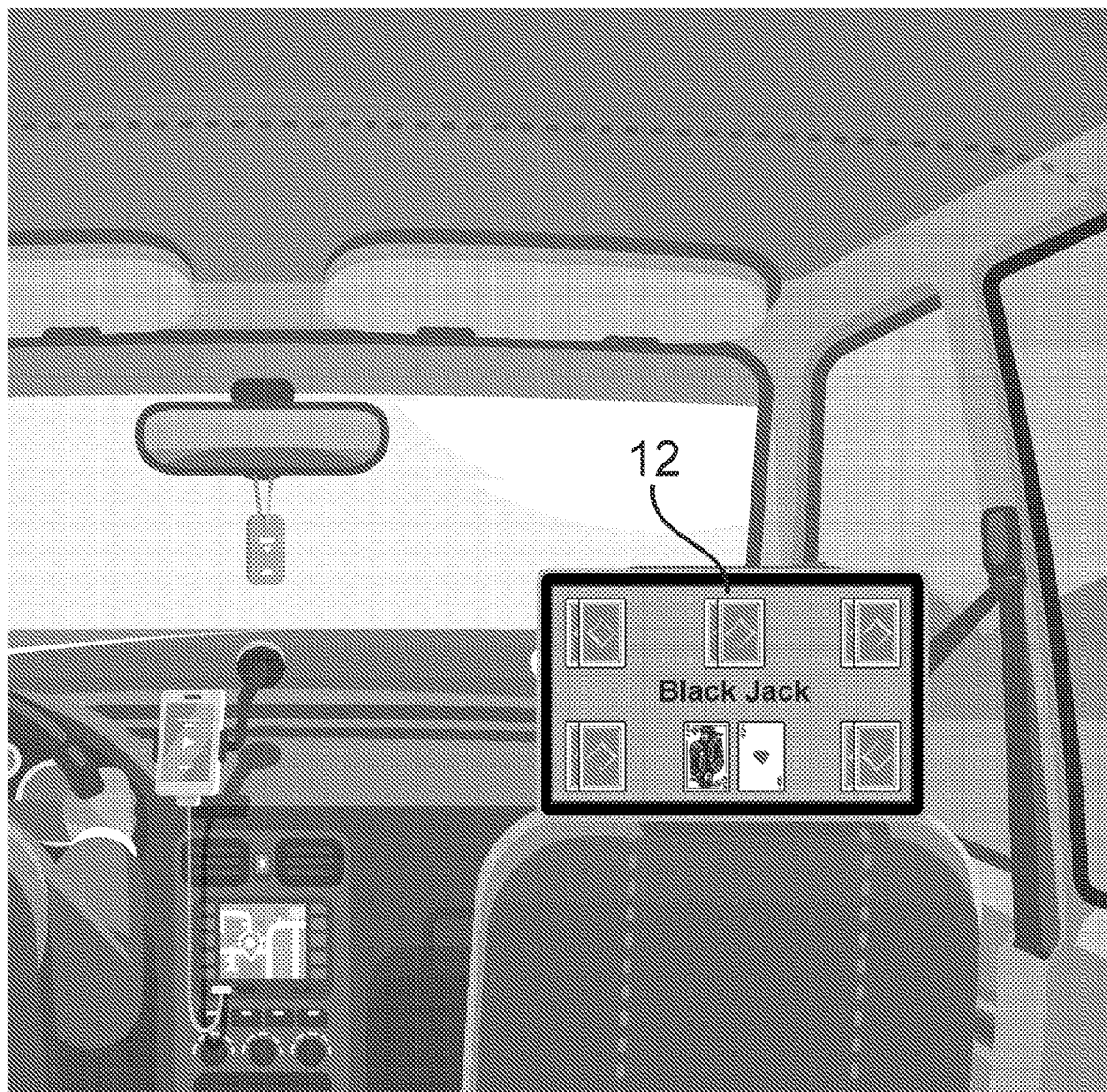
FIG. 13 is a perspective view of business computing device of a route advertisement/entertainment system for a ride share vehicle according to an embodiment.
Figure 14:
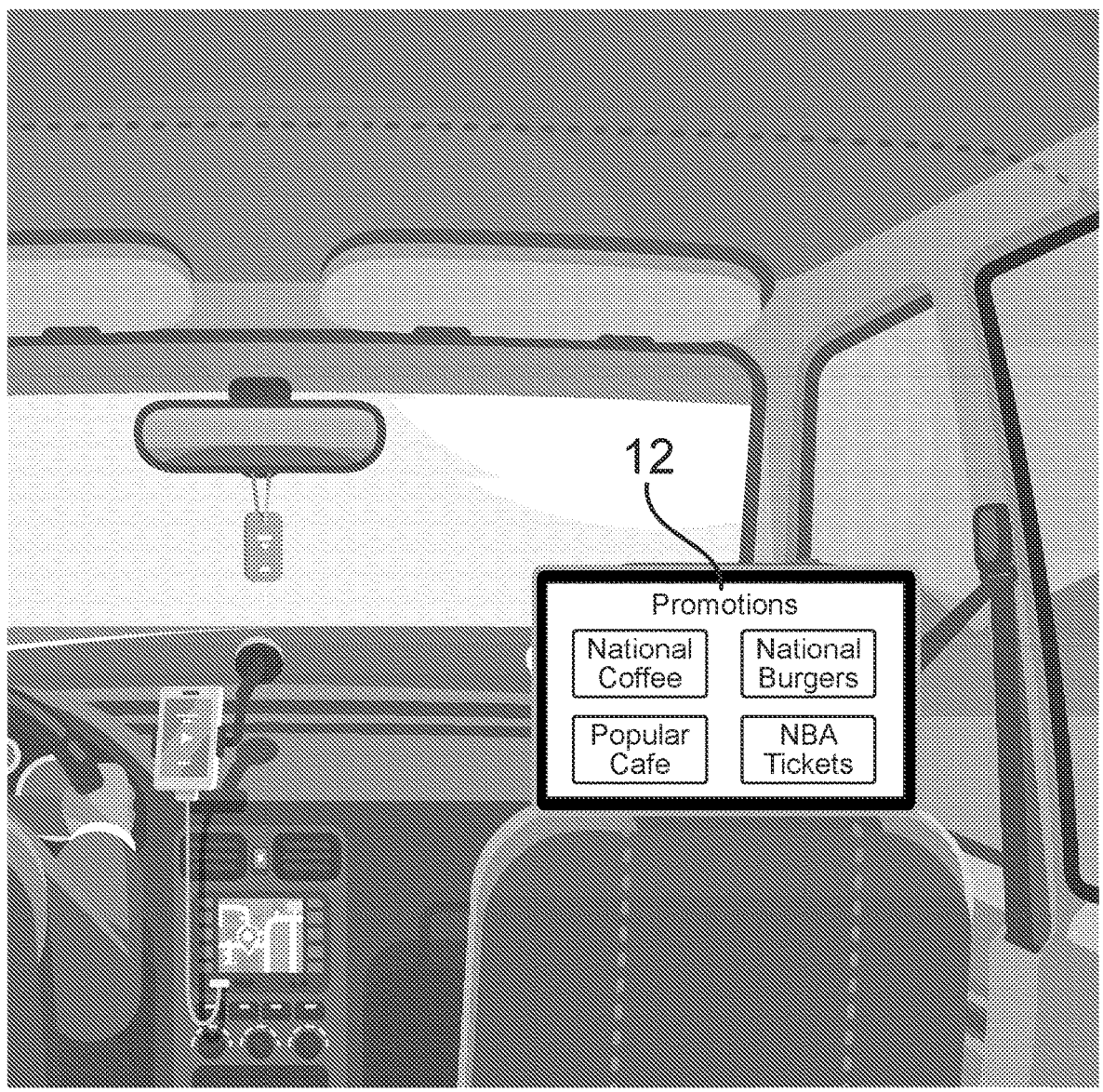
FIG. 14 is a perspective view of business computing device of a route advertisement/entertainment system for a ride share vehicle according to an embodiment.

In another example of operation of the system 10 is depicted in FIGS. 11-13. In response to receiving the positive acknowledgment, automatically access and process user content preferences corresponding to the user data and send for display on the business computing device 12 an interactive user interface with a request to view content corresponding to the user content preferences and/or the destination, as shown in FIG. 11. The business computing device 12 in FIG. 11 depicts the route, but may not need to depict the route, and also requests whether the passenger wishes to play a game on the trip to the airport. This is an example of the server sending a request to engage in content (game) based on the user content preferences (game play) and destination (airport) in the form of time. In this example, the server may send a request for content base on the estimated time to reach the destination, an example of which is shown in FIG. 11 by selecting a game that can be completed within the time to the destination. In at least this way, the advertisement/entertainment content is targeted to the passenger based on the passenger content preferences and destination. Then, in response to receiving a positive acknowledgment to view the content, the server 14 automatically sends, for display on the business computing device 12, content from advertisement/entertainment data associated with the content corresponding to the user content preferences and the destination, depicted in FIG. 12 as second request to select the type of game, again based on the user content preferences (such as poker, black jack, hearts or any other game that can be played). The server 14 then sends for display on the business computing device 12 the selected game, depicted as black jack in FIG. 13. It will be understood, that the system 10 may operate, in some embodiments, to play a game that is a real time game where the other players are other ride share passengers. In this embodiments, the server may connect players that are requesting the same game and have approximately the same amount of time or enough time to complete the game before any of the passengers that are players reach their destination.

Figure 15:
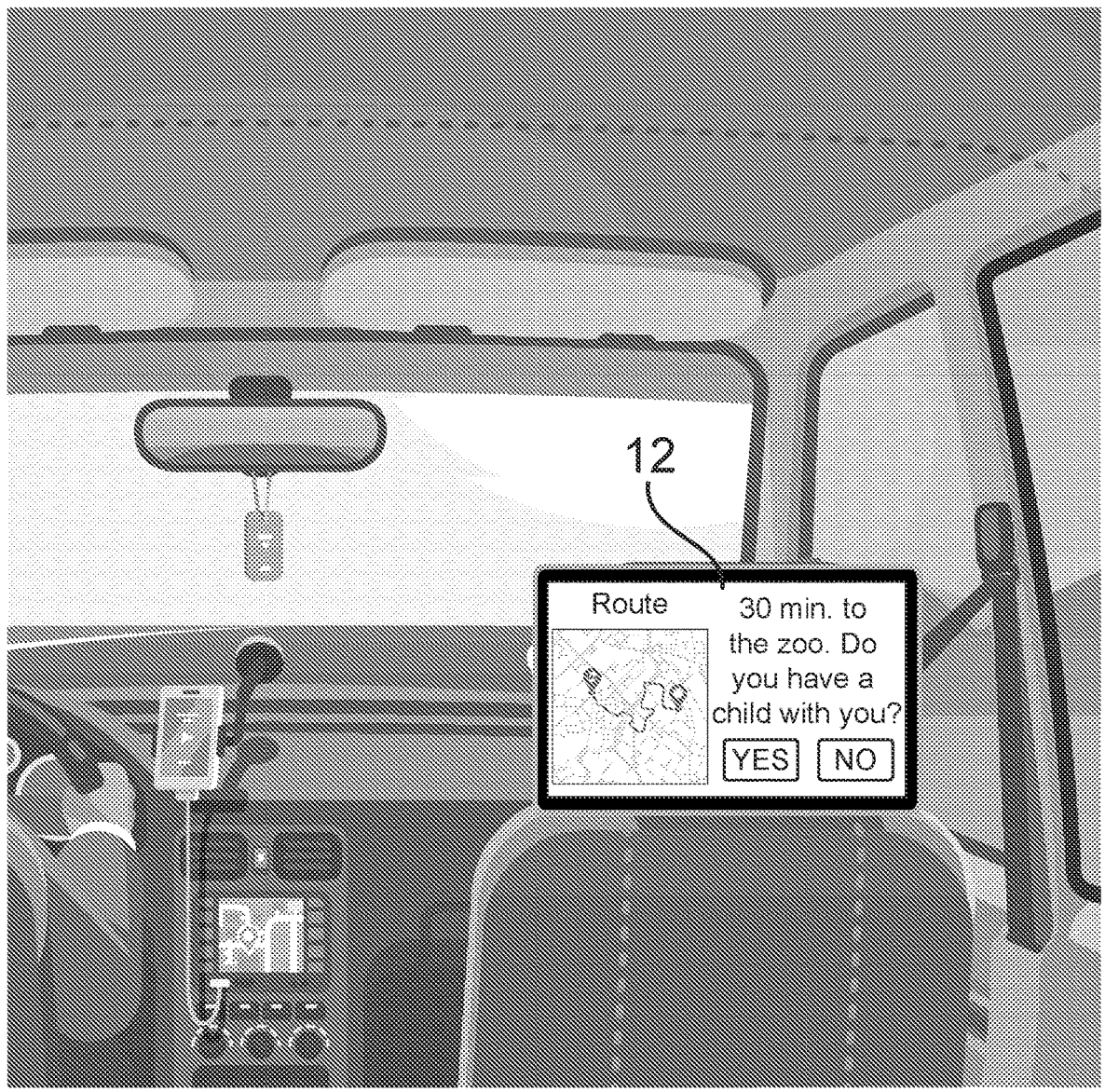
FIG. 15 is a perspective view of business computing device of a route advertisement/entertainment system for a ride share vehicle according to an embodiment.
Figure 16:
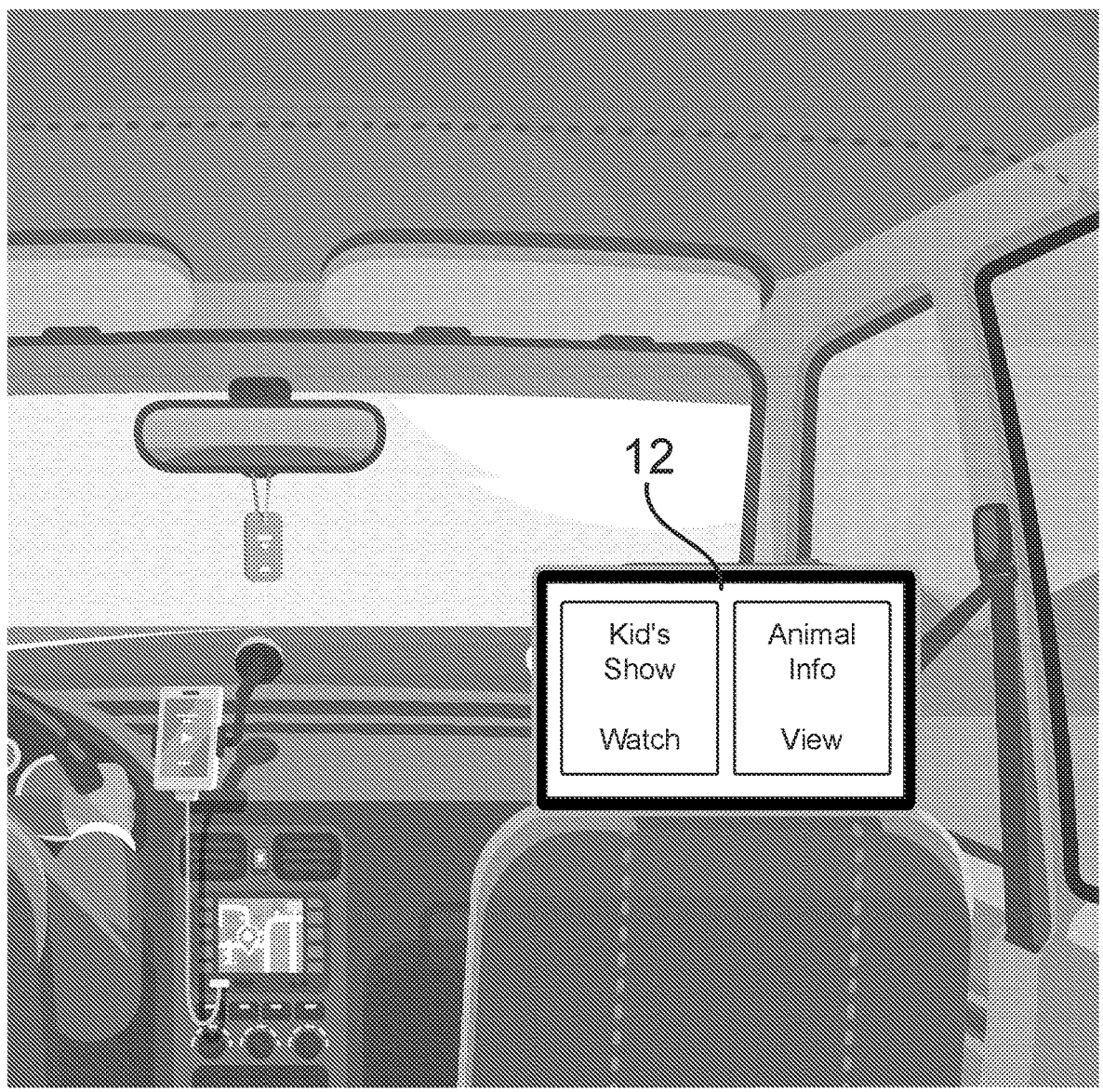
FIG. 16 is a perspective view of business computing device of a route advertisement/entertainment system for a ride share vehicle according to an embodiment.

In another example of operation of the system 10 is depicted in FIGS. 15 and 16. In response to receiving the positive acknowledgment, automatically access and process user content preferences corresponding to the user data and send for display on the business computing device 12 an interactive user interface with a request to view content corresponding to the user content preferences and/or the destination, as shown in FIG. 15. The business computing device 12 in FIG. 15 depicts the route, but may not need to depict the route, and also sends a request based on the destination, wherein the request, the server 14 is seeking for additional information to determine the advertisement/entertainment content. In this example, the destination is the zoo, which is a common destination for children, and so the server 14 sends a request seeking more information in the form of a yes/no question, such as, but not limited to, "Do you have a child with you?" in at least this way, the system 10 is a smart system and targets content based on the passengers and destination. Then, in response to receiving a positive acknowledgment to view the content, the server 14 automatically sends, for display on the business computing device 12, content from advertisement/entertainment data associated with the content corresponding to the user content preferences, additional information entered by the passenger (i.e. yes there is a child with the passenger) and the destination (zoo), depicted in FIG. 16 as second request to select the type of children's content, such as, without limitation, watch a kid's show or view animal information (since the destination is the zoo). The server 14 then sends for display on the business computing device 12 the selected content (not shown).

With reference to FIGS. 1 and 17-36, another embodiment of system 10 may operate to establish a contest game that can be played utilizing the system 10. The system includes the components as described in FIG. 1 of a route advertisement/entertainment system 10. The system 10 may include a business computing devices 12 that is coupled to a server 14. This coupling may be a network connection, such as a wireless connection, a Wi-Fi connection, a Bluetooth connection or the like, wherein the business computing device 12 may communicate with and receive communication from the server 14. The business computing device 12 may include a tablet, a smartphone, wearable devices and the like. The server 14, in some embodiments, may be a computer server or a cloud-based infrastructure architecture.

The server 14 may include a memory storing user data and advertisement/entertainment data. The memory of the server 14 may store user data, such as a username, a password, and profile information associated with the user's ride share profile and may also store user content preferences of the user, such as entertainment preferences, interested subjects/topics and so forth. It may also store advertisement/entertainment data such as, but not limited to, entertainment content, advertisement content and so forth, wherein the entertainment content and the advertisement content are in a form of contest games content that may be played by a user through the business computing device 12.

The server 16 may be coupled to the Internet 16 through a network connection similar to those described above. The connection to the Internet 16 allows the server 14 to utilize the Internet 16 for obtaining information that may be utilized as part of the system 10.

Figure 17:
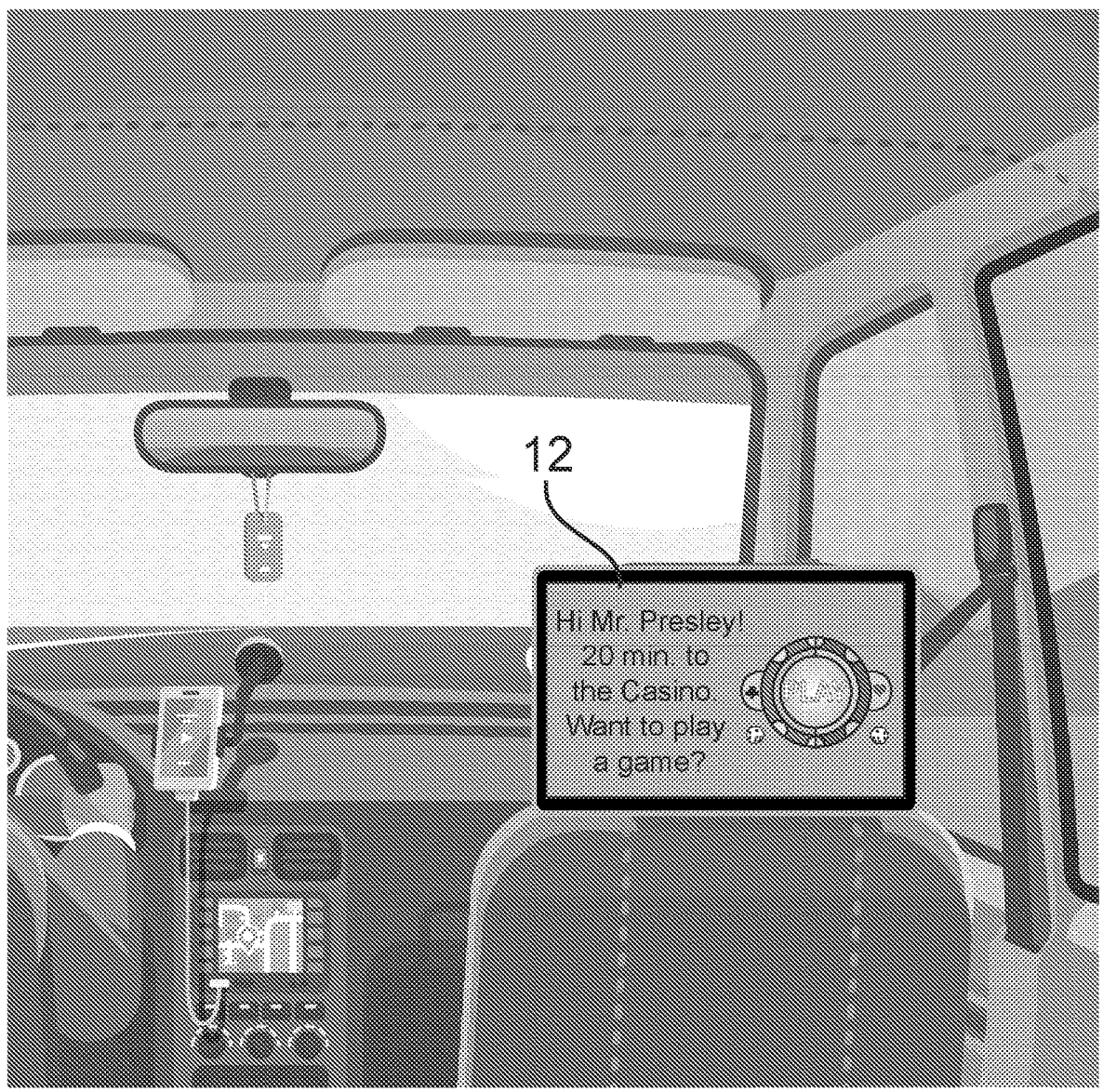
FIG. 17 is a perspective view of business computing device of a route advertisement/entertainment system operating a contest game for use in a ride share vehicle according to an embodiment.

Referring to FIGS. 17-23, the operation of the system 10 is depicted. A user may utilize a user computing device 20 operating a ride share app to request a ride and select a ride share driver operating a ride share vehicle. The system 10 may operate once the ride share vehicle picks up the user as a passenger. The server 14 may be programmed to receive a signal from a ride share driver device, the signal including user data of the passenger that has been picked up and an indication that a ride to a destination has been initiated. The server 14 may then establish a connection with the business computing device 12 in response to receiving the signal from the ride share driver device and send for display on the business computing device 12 an interactive user interface with a request to engage with the system 10 during travel to the destination, as shown in FIG. 17. The business computing device 12 in FIG. 17 may display a greeting identifying the rider, the estimated time to the destination (i.e. 20 minutes to the casino) and a request to the passenger if the passenger wishes to engage with the system 10 by playing a game. The passenger may then select "play" (a positive acknowledgment) or nothing (a negative acknowledgment). If the user selects "play", the business computing device 12 sends a signal that indicates a positive acknowledgment to the server 14.

Figure 18A:
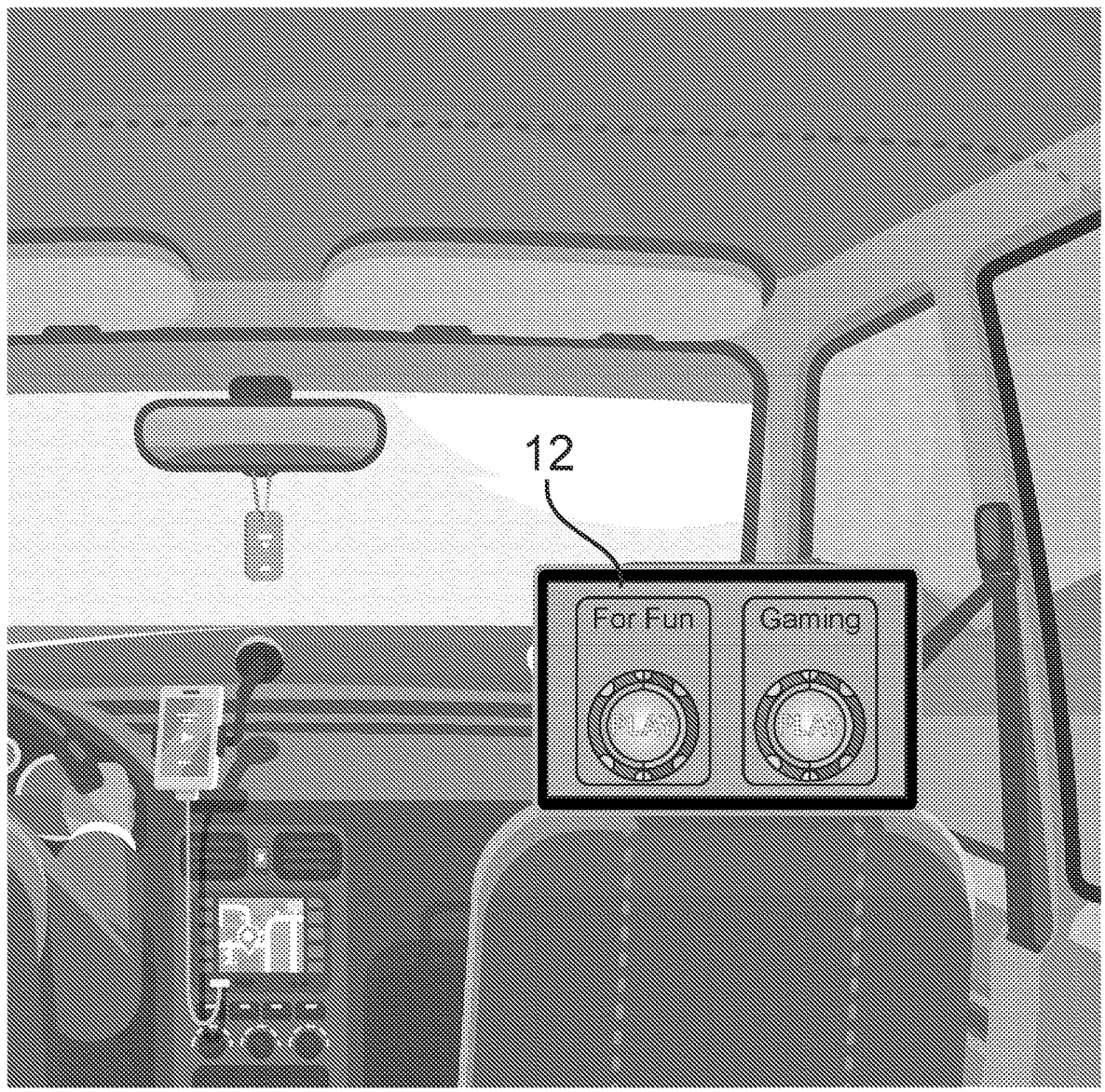
FIG. 18A is a perspective view of business computing device of a route according to an embodiment, showing a request to play a contest game.
Figure 18B:
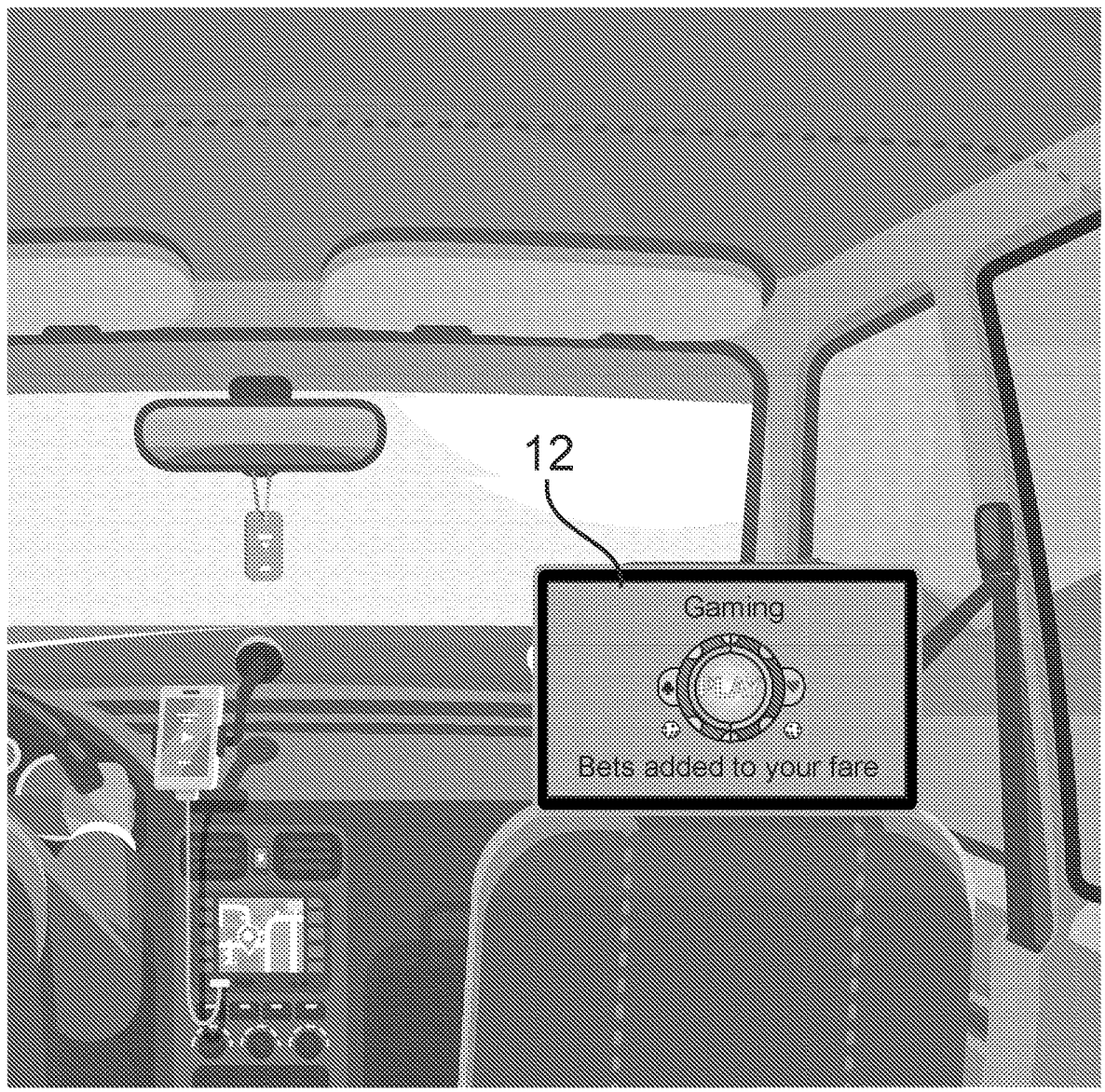
FIG. 18B is a perspective view of business computing device of a route advertisement/entertainment system operating a contest game for use in a ride share vehicle according to an embodiment user interface explaining that the contest game is played for credits that are added to the passenger's account.
Figure 18C:
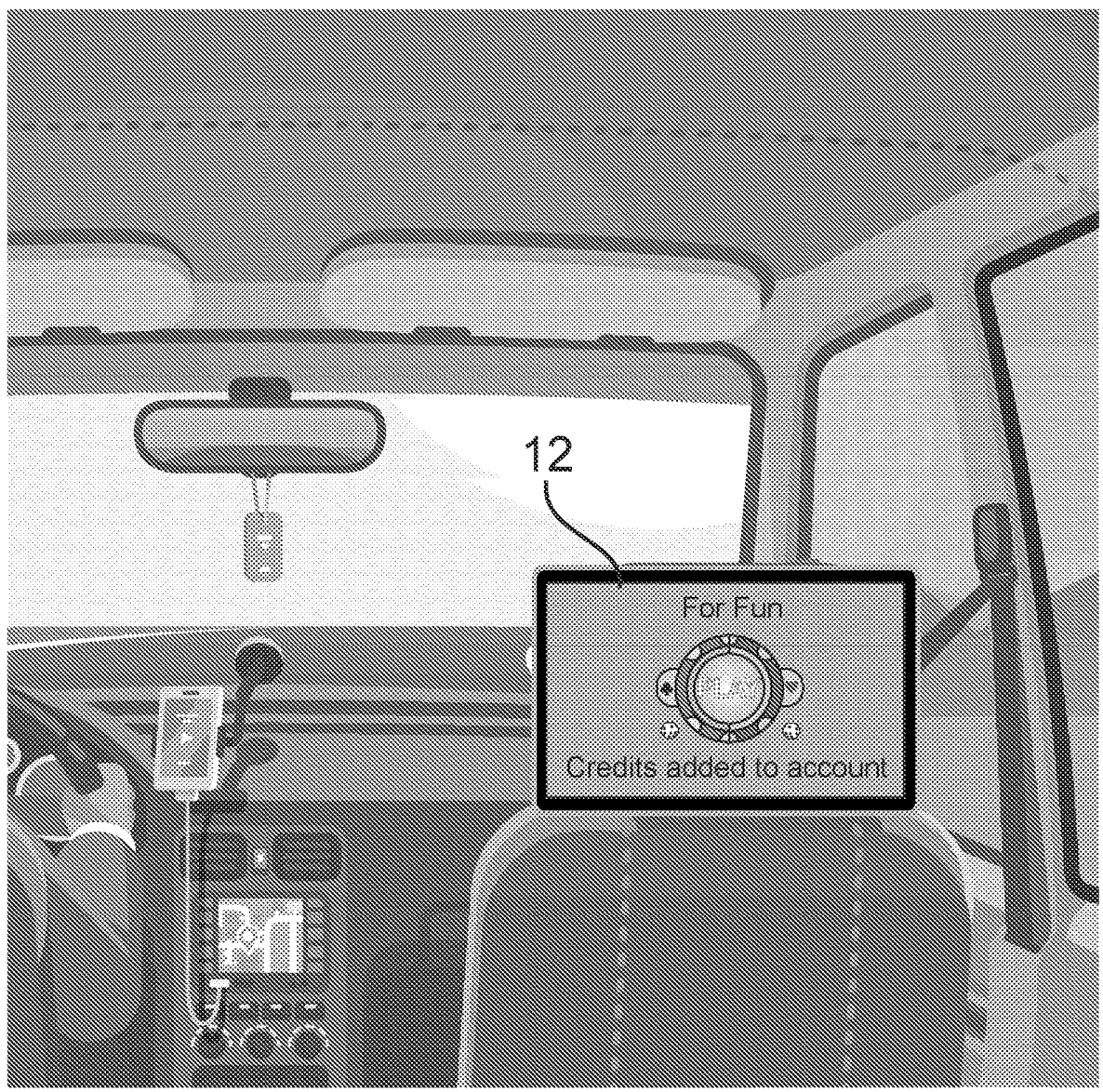
FIG. 18C is a perspective view of business computing device of a route advertisement/entertainment system operating a contest game for use in a ride share vehicle according to an embodiment, showing a user interface explaining that the contest game may include wagers that are automatically added to the fare of the ride.

The server 14 may be programmed to receive the signal from the business computing device 12 indicating a positive acknowledgment to engage with system 10, and, in response to receiving the positive acknowledgment, automatically access and process user content preferences corresponding to the user data and send for display on the business computing device 12 an interactive user interface with a request to play a contest game "For Fun" or "Gaming", as shown in FIG. 18A. Then, in response to receiving a positive acknowledgment to play "For Fun", the server 14 may automatically send, for display on the business computing device 12, a "For Fun" user interface explaining that the contest game is played for credits that are added to the passenger's account, as shown in FIG. 18B. Alternatively, in response to receiving a positive acknowledgment to play "Gaming", the server 14 may automatically send, for display on the business computing device 12, a "Gaming" user interface explaining that the contest game may include wagers that are automatically added to the fare of the ride, as shown in FIG. 18C. In embodiments, the system 10 may operate to limit the amounts of wagers that can be made utilizing the system or utilize other means to ensure that the payment method or methods stored on the ride share profile of the passenger can cover the wagers that may be made utilizing the system. The system operates essentially the same whether the contest game is "For Fun" or "Gaming," with the exception of making wagers, and therefore this disclosure will focus on the "For Fun" aspect with an understanding that game play and features discussed may be utilized in a "Gaming" fashion requiring bets and so forth as part of the play.

Figure 19:
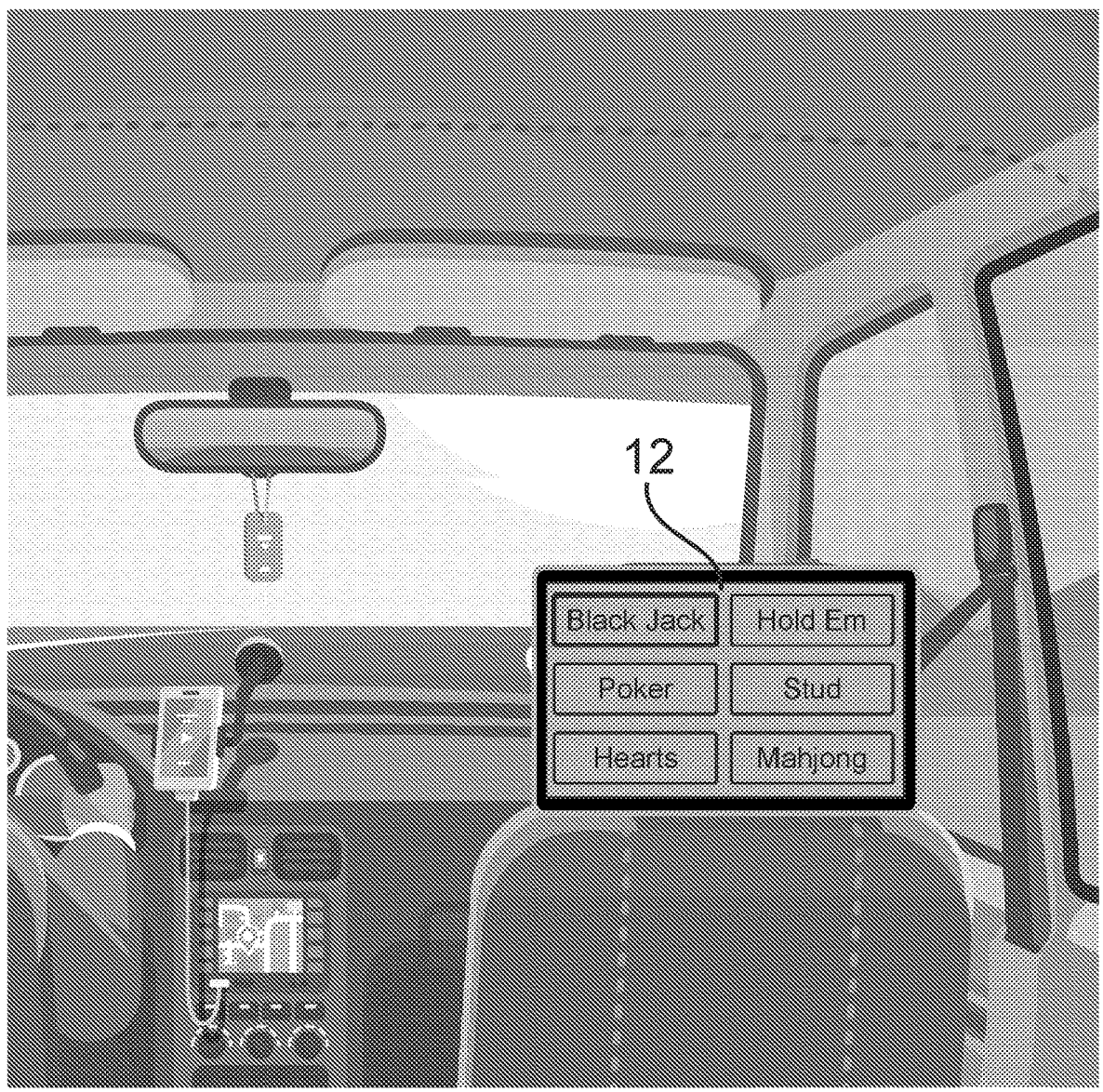
FIG. 19 is a perspective view of business computing device of a route advertisement/entertainment system operating a contest game for use in a ride share vehicle according to an embodiment.

The server 14 may be further programmed to, in response to receiving the positive acknowledgment of a "For Fun" contest game, automatically access and process user content preferences corresponding to the user data and send for display on the business computing device 12 an interactive user interface with one or more contest games that can be played on the business computing device 12 based on the user content preferences and that can be completed within the time of travel to the destination in the ride share vehicle, as shown in FIG. 19. Each of the one or more contest games may be a selectable element that may be selected by the passenger utilizing the business computing device 12. For example, and without limitation, some of the selectable elements with contest games displayed may include, black jack, hold em, poker, stud, hearts, mahjong and any other type of game that can be played. In response to receiving an input from the business computing device 12 of the selectable element associated with contest game (i.e. selecting "Black Jack" as shown in FIG. 19), the server 14 may be programmed to send for display and game play the selected contest game, as shown in FIG. 20.

Figure 20:
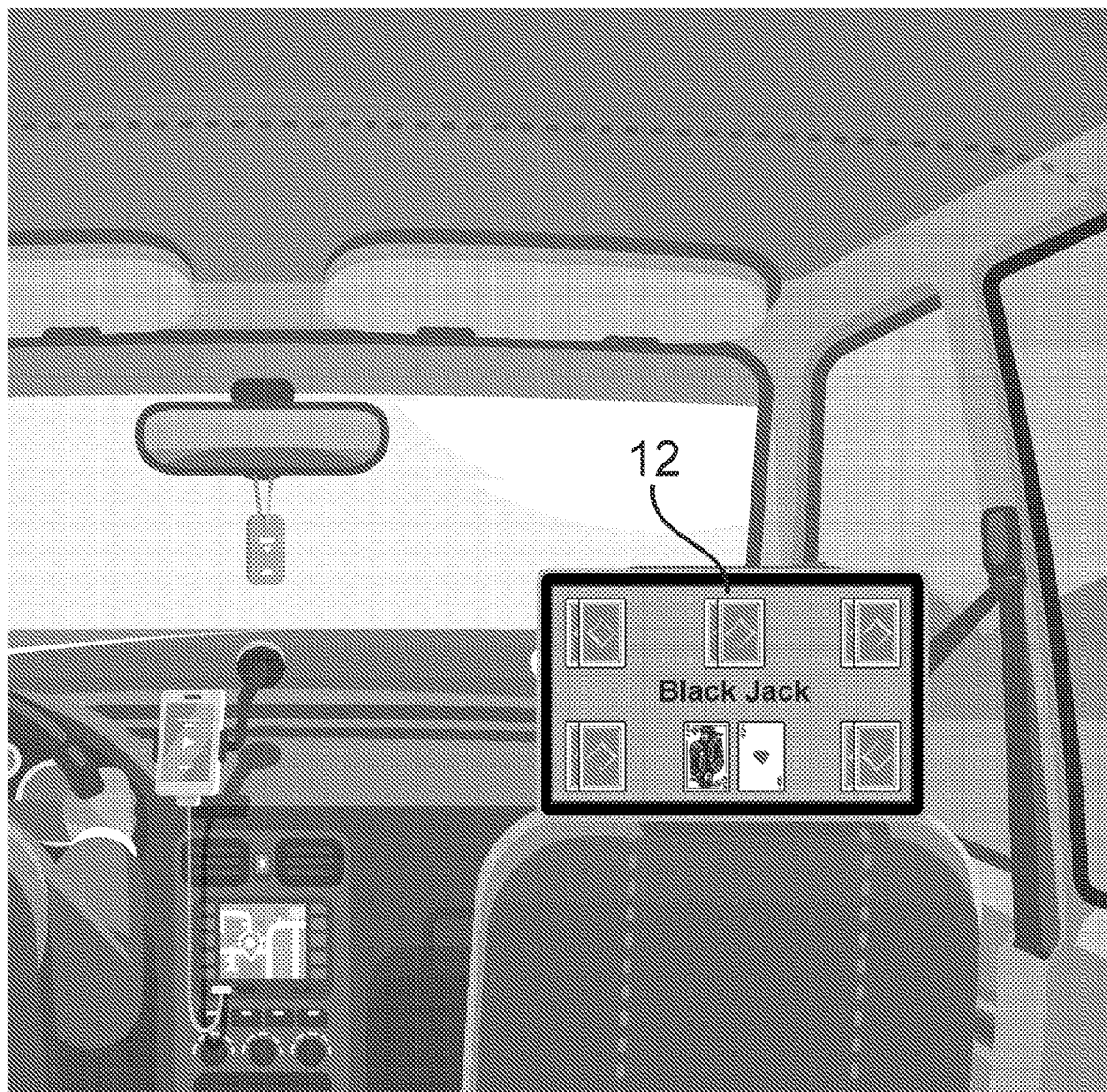
FIG. 20 is a perspective view of business computing device of a route advertisement/entertainment system operating a contest game for use in a ride share vehicle according to an embodiment.
Figure 21:
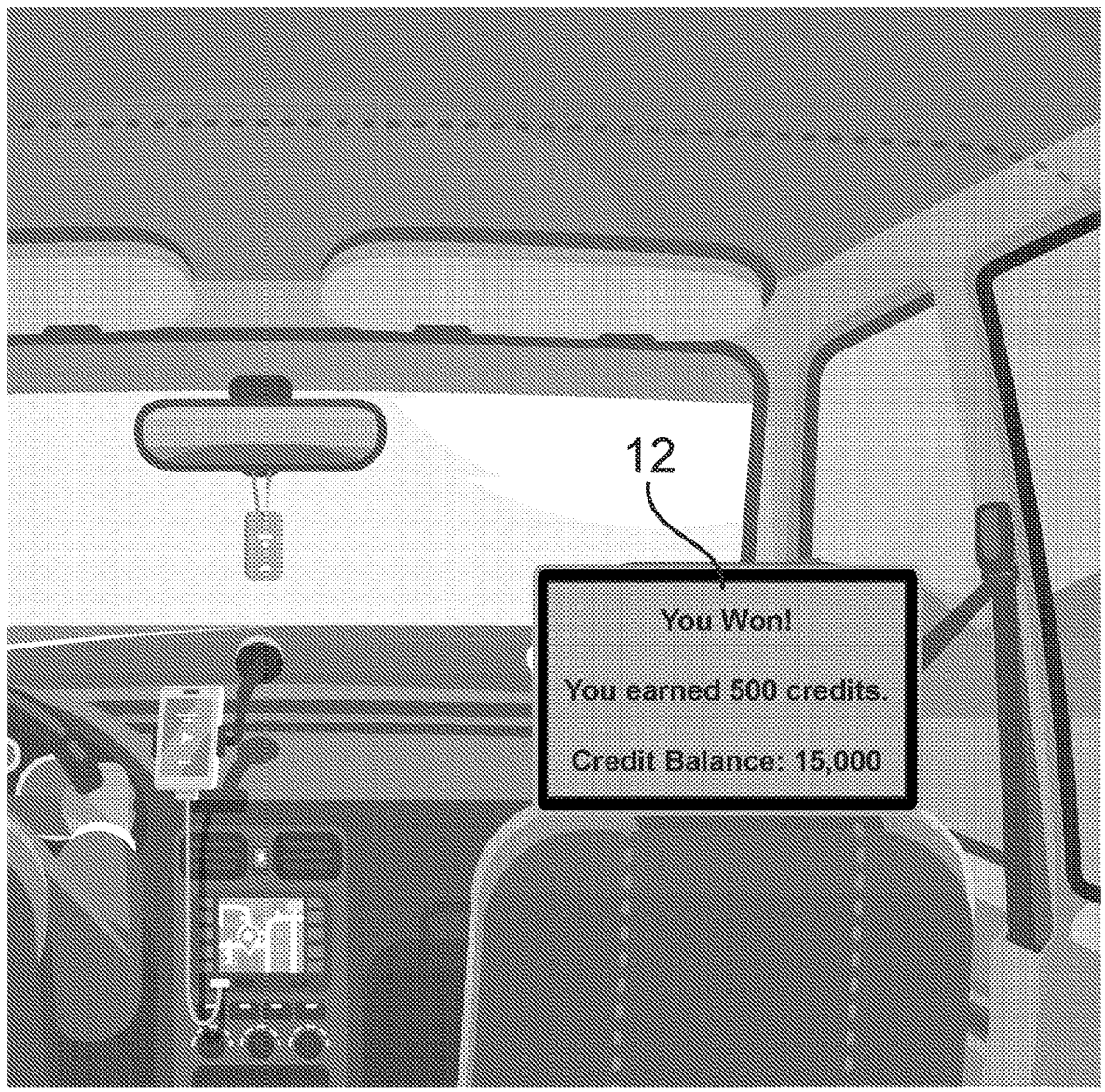
FIG. 21 is a perspective view of business computing device of a route advertisement/entertainment system operating a contest game for use in a ride share vehicle according to an embodiment.
Figure 22:
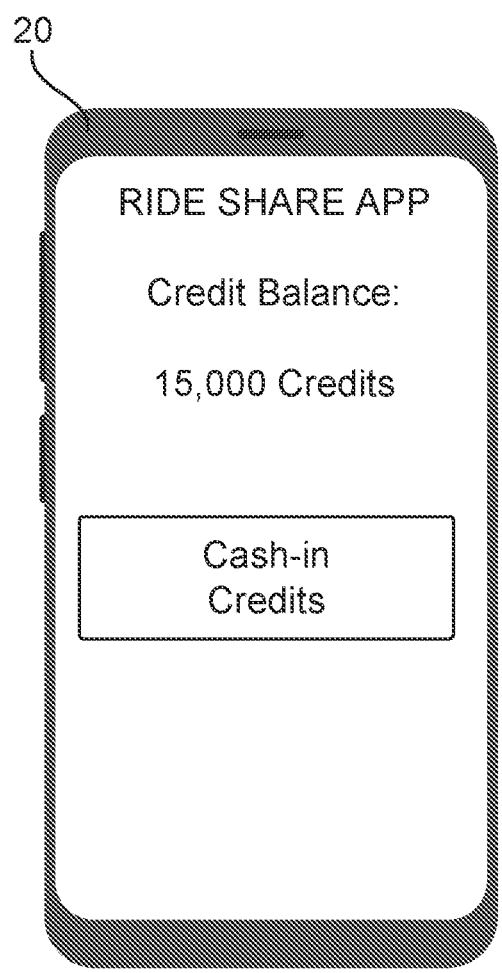
FIG. 22 is a perspective view of business computing device of a route advertisement/entertainment system operating a contest game for use in a ride share vehicle according to an embodiment.
Figure 23:
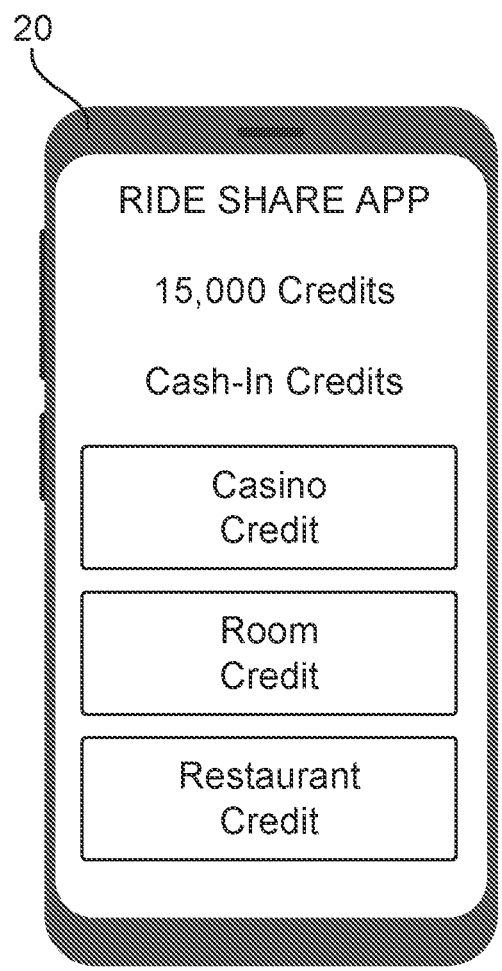
FIG. 23 is a perspective view of business computing device of a route according to an embodiment.

The passenger may then play the contest game utilizing the business computing device 12, such as black jack as shown in FIG. 20. In response to the passenger winning the game, the server 14 may be programmed to send for display on the business computing device 12 a user interface indicating the passenger won, as shown in FIG. 21. The user interface indicating the passenger won may depict the credits earned for winning that game, and may also depict the credit balance that passenger has stored in his or her account. This allows a passenger to play a game utilizing the system 10 without the need of utilizing the passenger's own mobile device. However, since the credits are stored on the passenger's account, the passenger may at any time during or after the ride utilize his or her user computing device 20 to cash-in credits, as shown in FIG. 22. The passenger may operate a ride share app with the user computing device 20 to cash in the credits stored in the account and the server 14 may send for display on the user computing device 20, options for cashing in credits that are associated with the destination of the ride share vehicle, which is the destination of the passenger. Cor example, if the passenger selects to cash-in credits as shown in FIG. 22, the server 14 receives this signal to cash-in credits and automatically sends for display on the user computing device 20 recommended cash-in options corresponding to the destination and/or the user content preferences. If the destination is a casino as shown in FIGS. 17-23, the recommended cash-in options may be selectable elements corresponding to the casino, such as "Casino Credit," "Room Credit," and "Restaurant Credit." It is understood that these are just a few options corresponding to a casino, and that the system 10 operates with programming operated by the server 14 to tailor the recommendations based on the destination and the system 10 is not limited to the depicted options. Selection of one of the selectable elements allows the passenger to cash-in credits for the selected option. It is also understood that, while not shown, the user may select an amount of the passenger's credit balance to cash-in for the selected option, thereby allowing the passenger to cash-in for multiple items or to cash-in only a portion and retain the remainder of the credit stored in his or her account.

Figure 24:
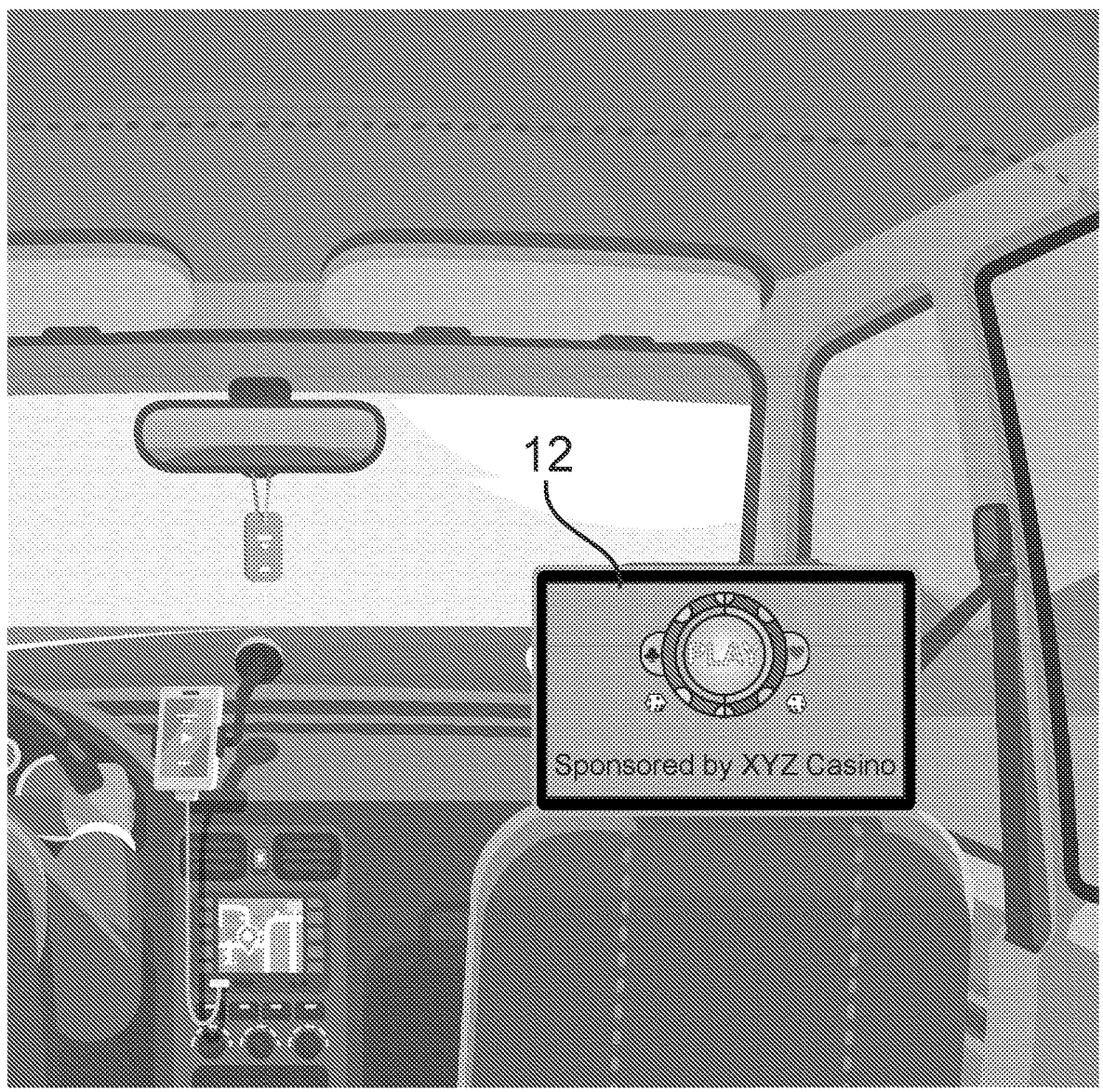
FIG. 24 is a perspective view of business computing device of a route advertisement/entertainment system operating a contest game for use in a ride share vehicle according to an embodiment.
Figure 25:
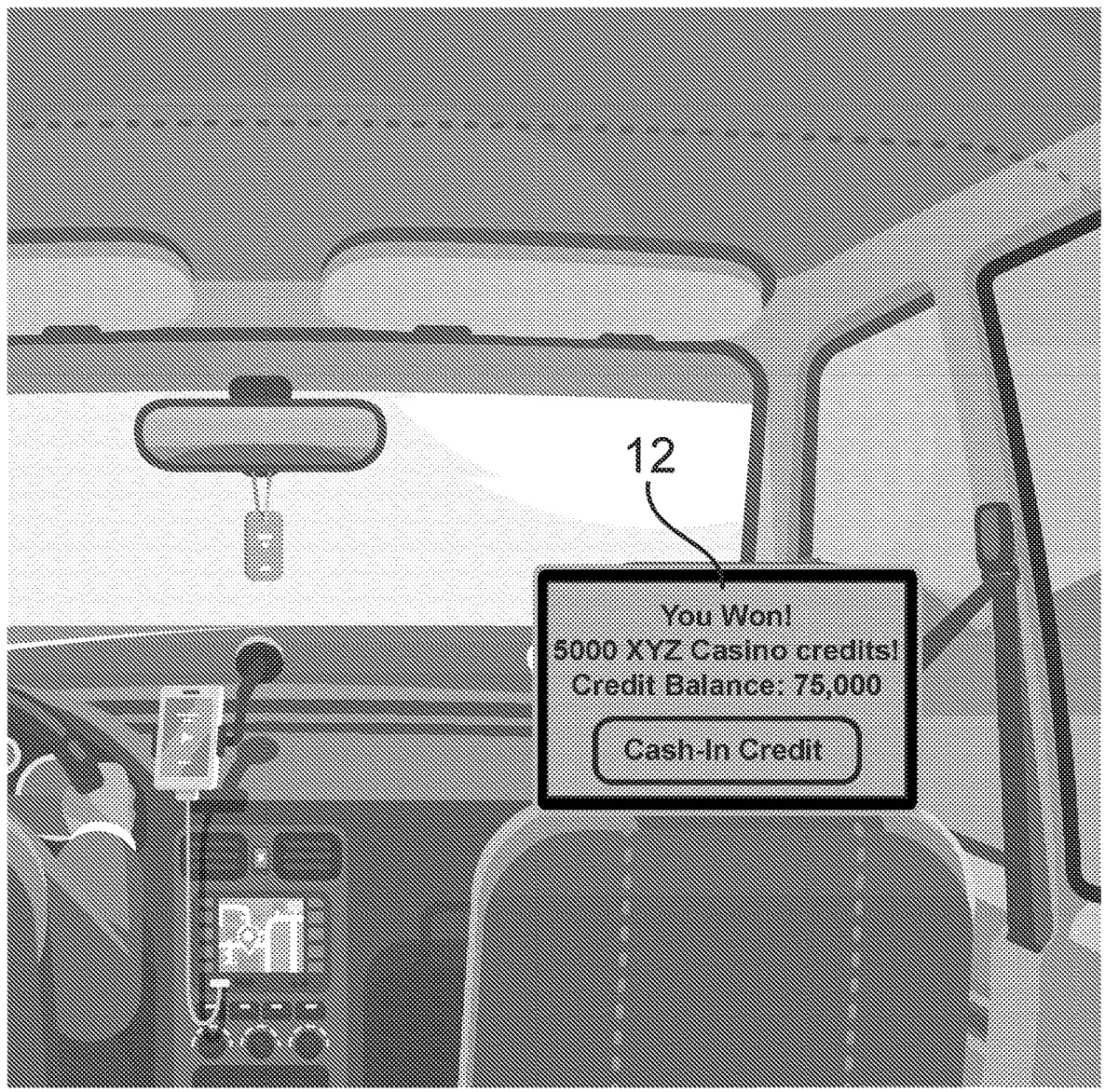
FIG. 25 is a perspective view of business computing device of a route advertisement/entertainment system operating a contest game for use in a ride share vehicle according to an embodiment.
Figure 26:
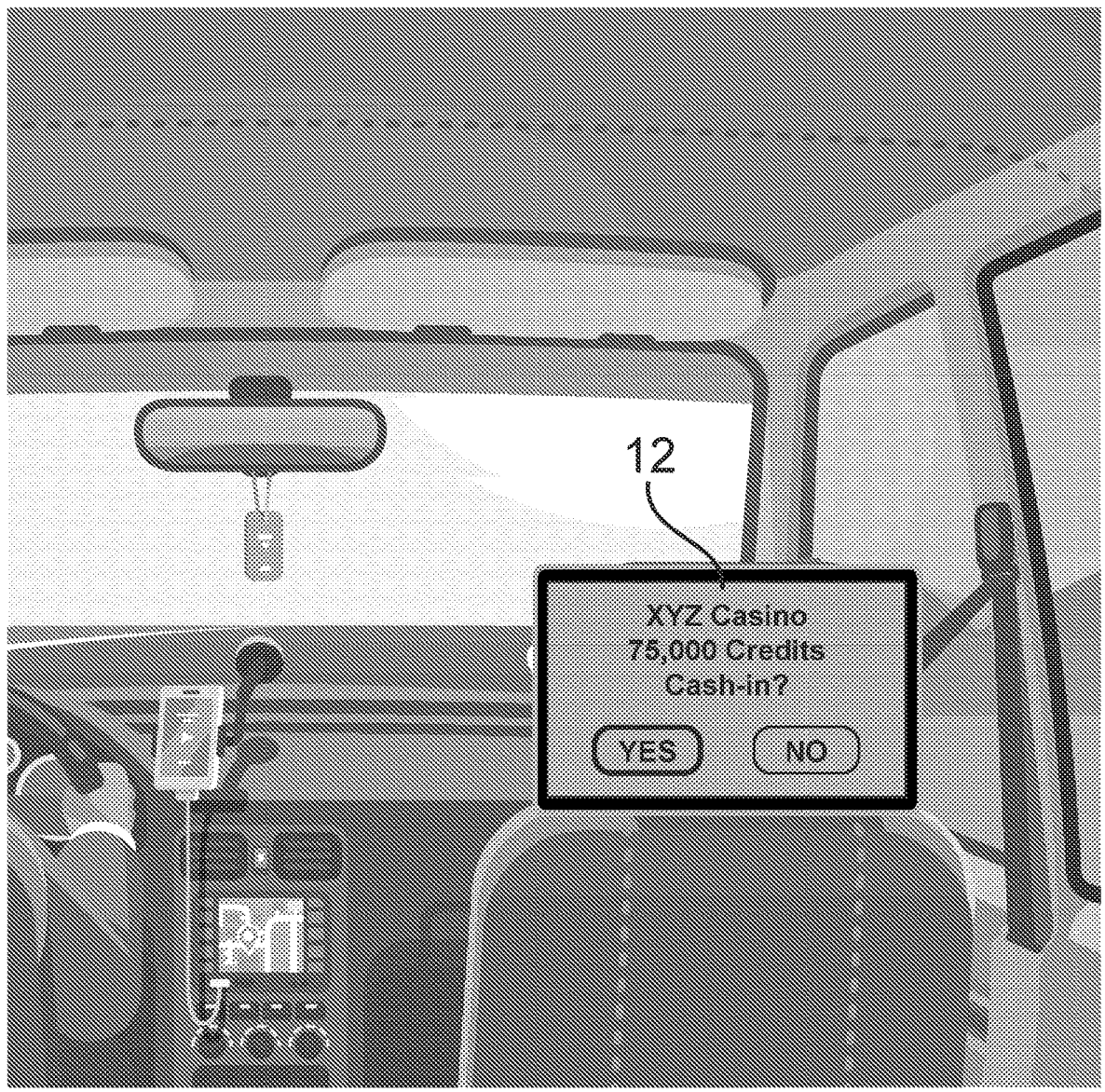
FIG. 26 is a perspective view of business computing device of a route advertisement/entertainment system operating a contest game for use in a ride share vehicle according to an embodiment.
Figure 27:
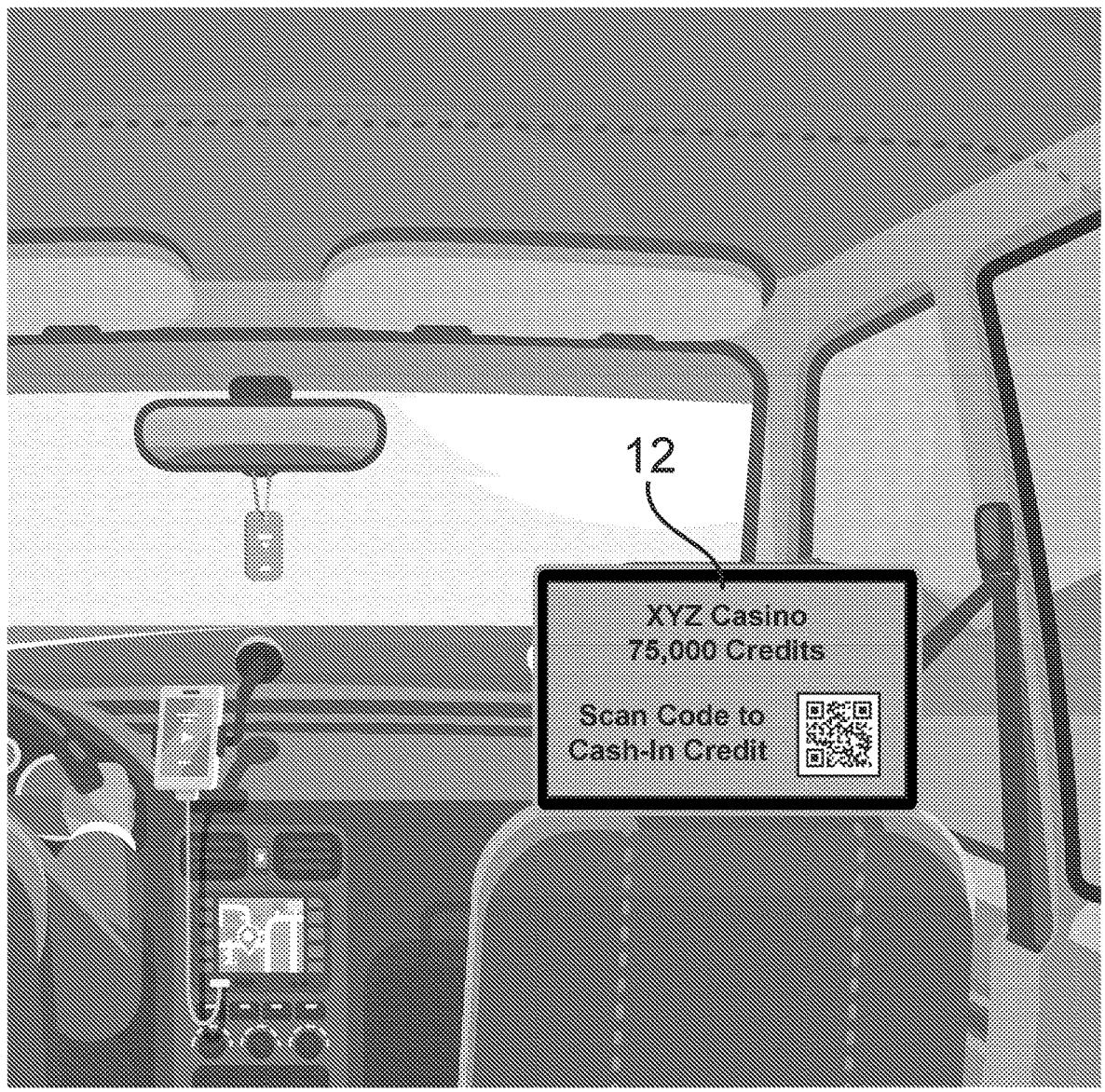
FIG. 27 is a perspective view of business computing device of a route advertisement/entertainment system operating a contest game for use in a ride share vehicle according to an embodiment.

Operation of the system 10 for contest games may include other variations as shown in FIGS. 24-36. For example, the game may include a sponsor for the games and the credits are for that specific business that sponsors the game. An example is depicted in FIGS. 24-28, wherein the sponsor is XYZ Casino. The sponsor may be the business that is located at the address of the ride share destination. In this example, as shown in FIG. 24, the sponsor is XYZ Casino. The passenger may select and play a game contest as discussed with respect to FIGS. 17-20 and in response to winning, the server 14 may send for display on the business computing device 12, a user interface indicating the passenger won, as shown in FIG. 25. The user interface may depict the amount of credits won for XYZ Casino and the credit balance for XYZ Casino. The user interface may also include a selectable element to "Cash-in Credit" as shown in FIG. 25. A signal may be sent to the server 14 in response to selection of the "Cash-in Credit" selectable element, and the server 14, in response to receiving the signal, may send a request to confirm whether the passenger wishes to cash-in the sponsor credit (XYZ Casino Credit) as depicted in FIG. 26. The passenger may select a positive acknowledgment ("yes") or a negative acknowledgement ("no"), wherein the selection results in cashing in credit as previously depicted, or, the server 14 may send a code, such as a QR code to scan with a user computing device 20 to cash-in credits, as shown in FIG. 27.

Figure 28:
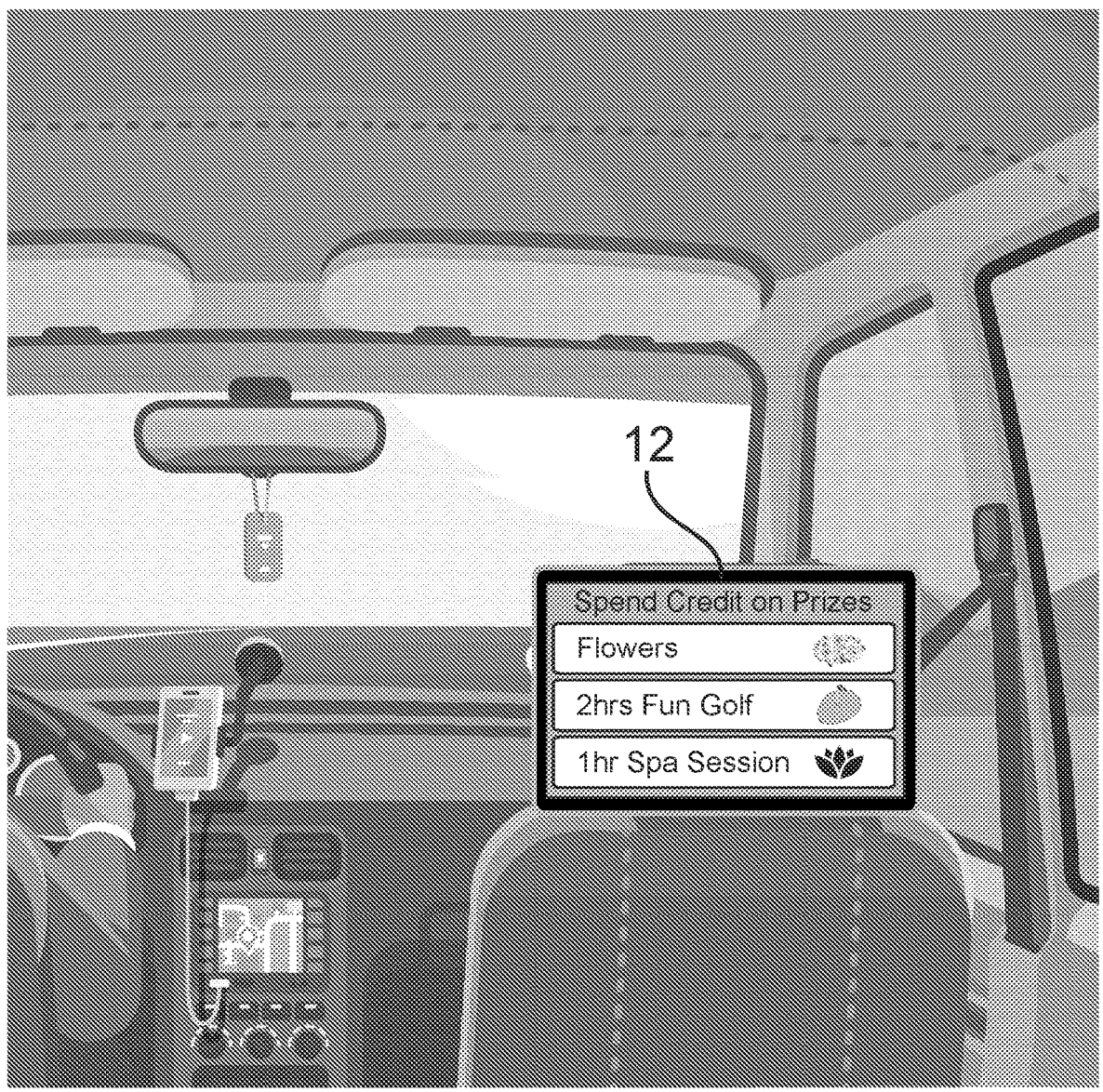
FIG. 28 is a perspective view of business computing device of a route advertisement/entertainment system operating a contest game for use in a ride share vehicle according to an embodiment.

In some embodiments, the server 14 may be programmed to, in response to a positive acknowledgment to cash-in credit, send predetermined prizes that may be selected. These prizes may correspond to the user preferences, the destination or both. For example, as shown in FIG. 28, selectable elements may be on an interactive user interface sent by the server 14 to the business computing device 12, where each selectable element is associated with a prize. For example, and without limitation, the prize may be sending flowers, 2 hrs at a fun golf location, 1 hr spa session and so forth.

Figure 29:
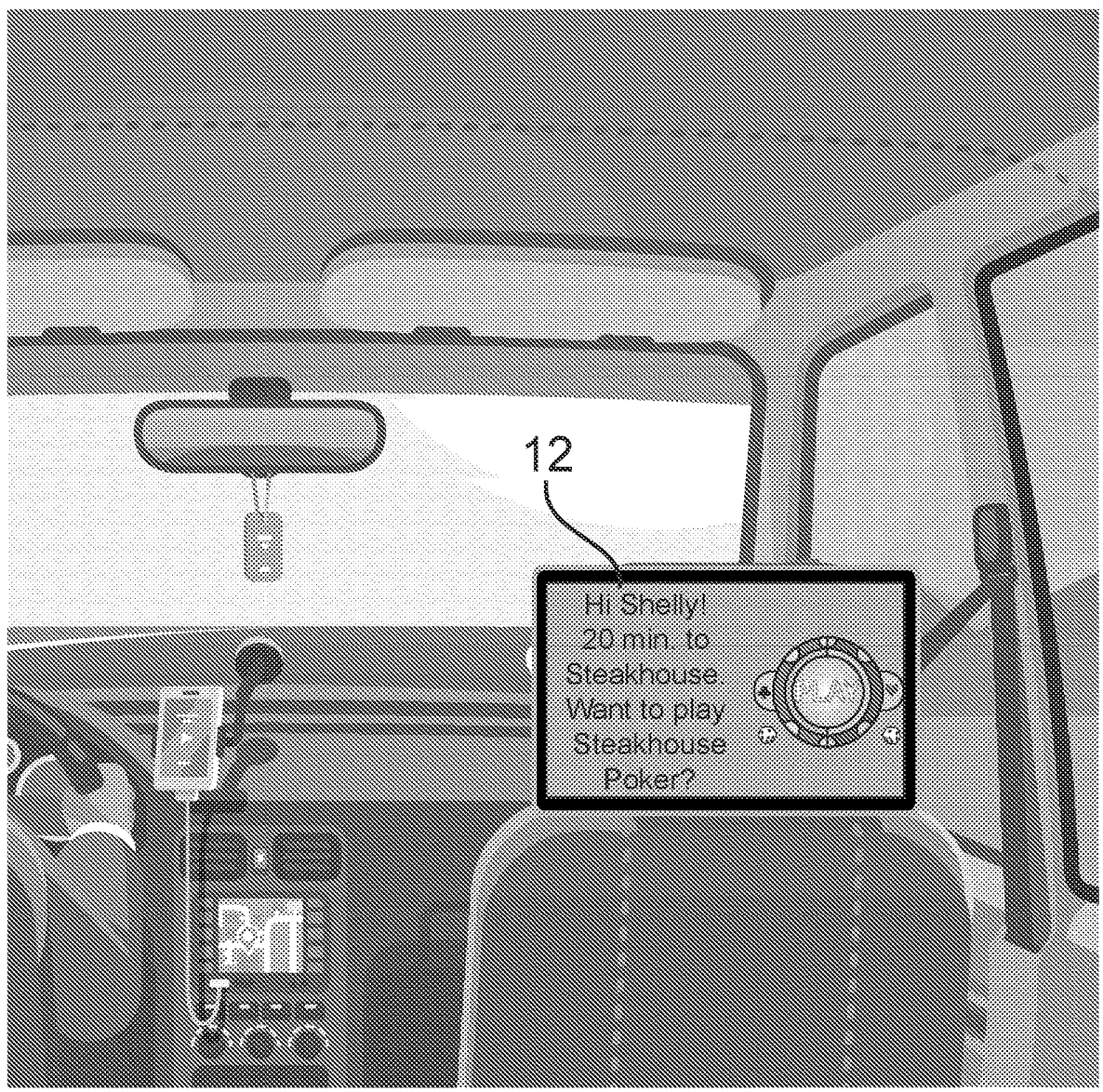
FIG. 29 is a perspective view of business computing device of a route advertisement/entertainment system operating a contest game for use in a ride share vehicle according to an embodiment.
Figure 30:
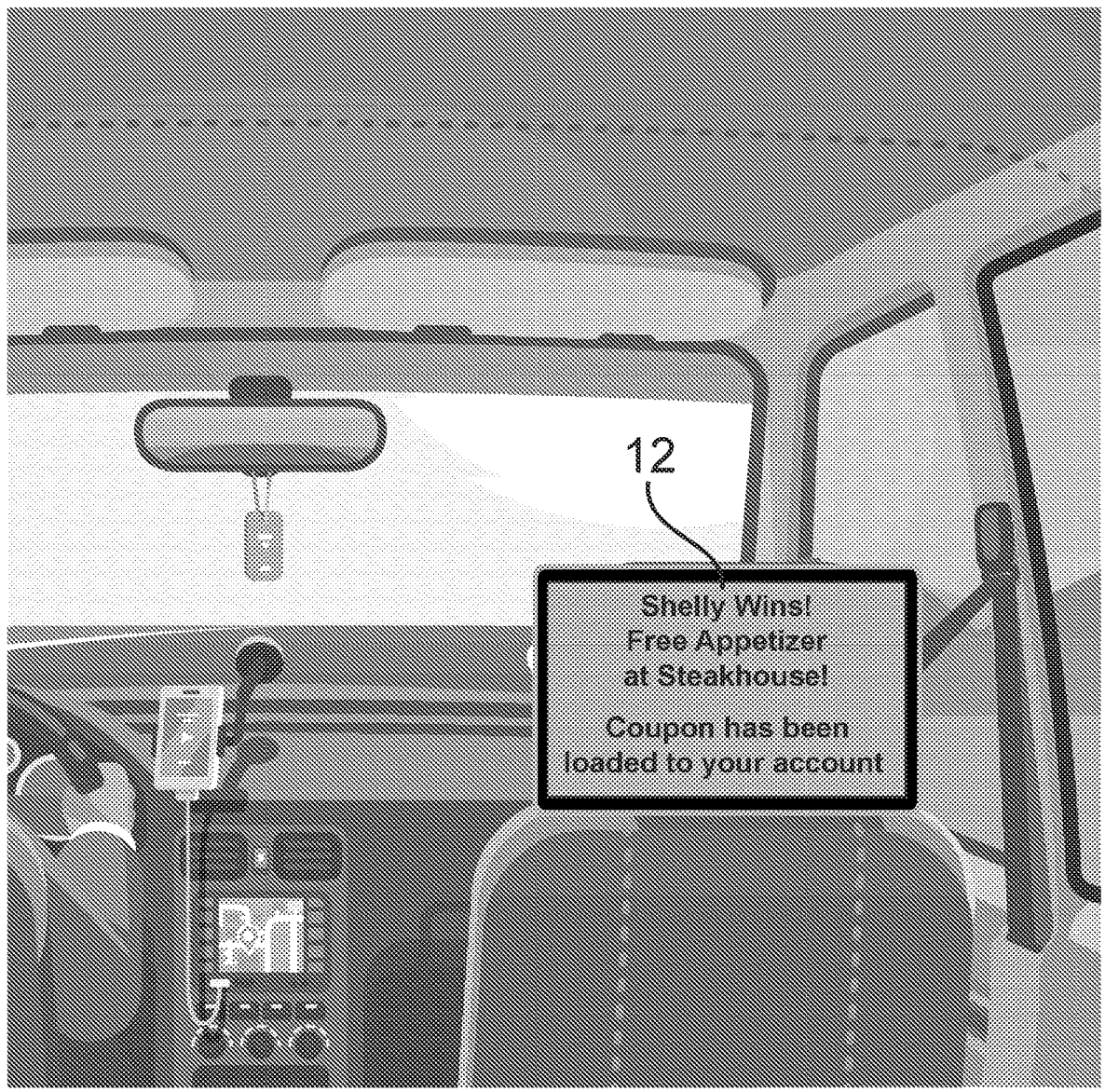
FIG. 30 is a perspective view of business computing device of a route advertisement/entertainment system operating a contest game for use in a ride share vehicle according to an embodiment.

In other embodiments, the system 10 may operate to provide advertisement capabilities to the locations in which the passenger is travelling. For example, FIGS. 29-30 depict such an embodiment. In this embodiment, the server 14 is programmed to send for display on the business computing device 12 an interactive user interface with a request to engage with the system 10 during travel to the destination, as shown in FIG. 29. The business computing device 12 in FIG. 29 may display a greeting identifying the rider, the estimated time to the destination (i.e. 20 minutes to Steakhouse) and a request to the passenger if the passenger wishes to engage with the system 10 by playing a game provided by the business at the destination (i.e. the Steakhouse). The passenger may then select "play" (a positive acknowledgment) or nothing (a negative acknowledgment). If the user selects "play", the business computing device 12 sends a signal that indicates a positive acknowledgment to the server 14. The passenger may select and play a game contest as discussed with respect to FIGS. 17-20 and in response to winning, the server 14 may send for display on the business computing device 12, a user interface indicating the passenger won, as shown in FIG. 30, along with identifying a prize that has been won, such as, but not limited to, a coupon for the business at the destination ("Free Appetizer at Steakhouse" as shown in FIG. 30). The prize may be automatically loaded to the passenger's account. In this embodiment, the contest game is directed by the business that the passenger is travelling to. The business, in some embodiments, may engage with the system 10 and establish odds of winning the game to be beneficial to the business, such as improving odds if the business traffic is low, and decreasing odds if the business traffic high, or for any other reason that the business wishes to adjust the odds.

Figure 31:
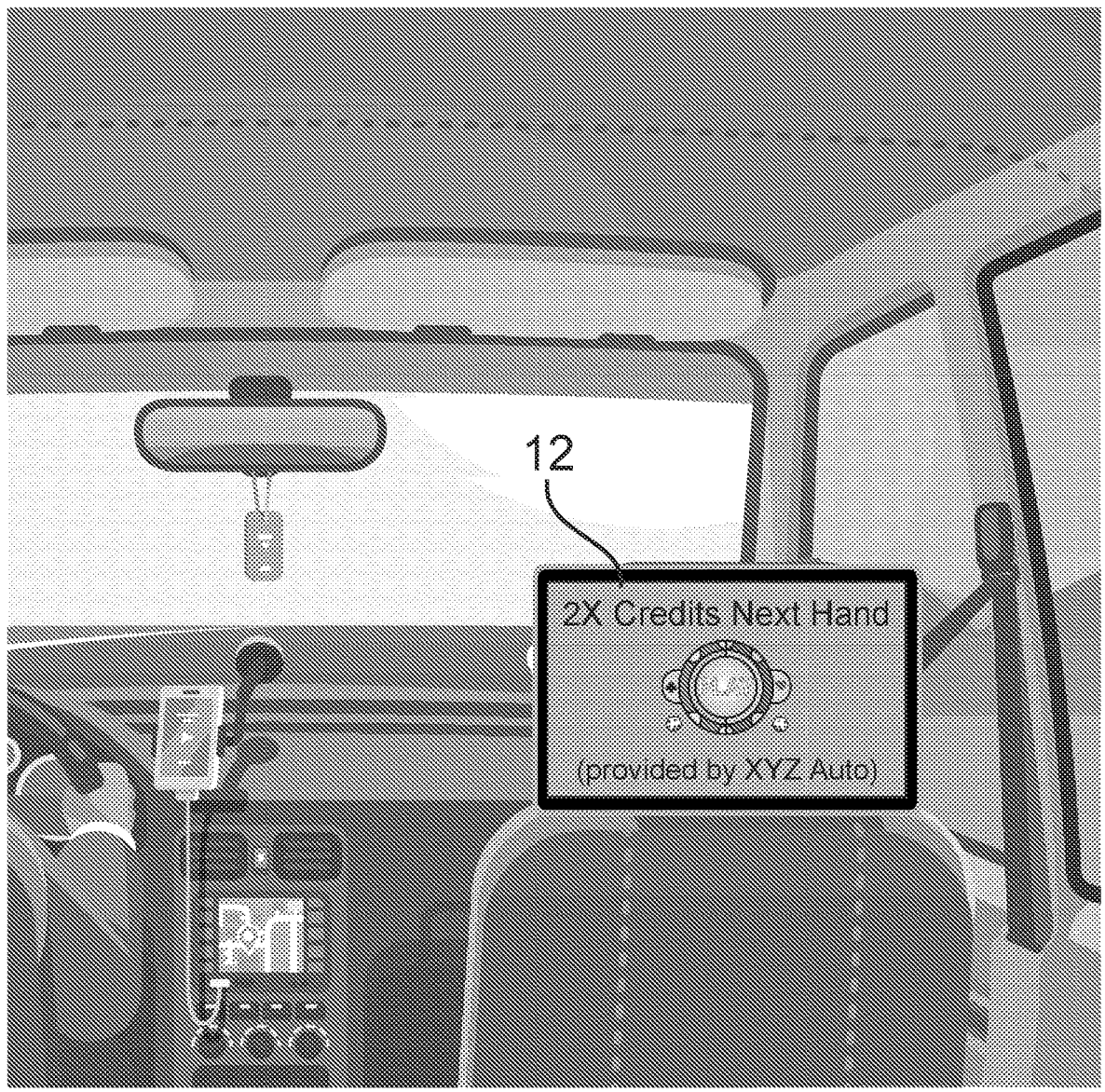
FIG. 31 is a perspective view of business computing device of a route according to an embodiment.
Figure 32:
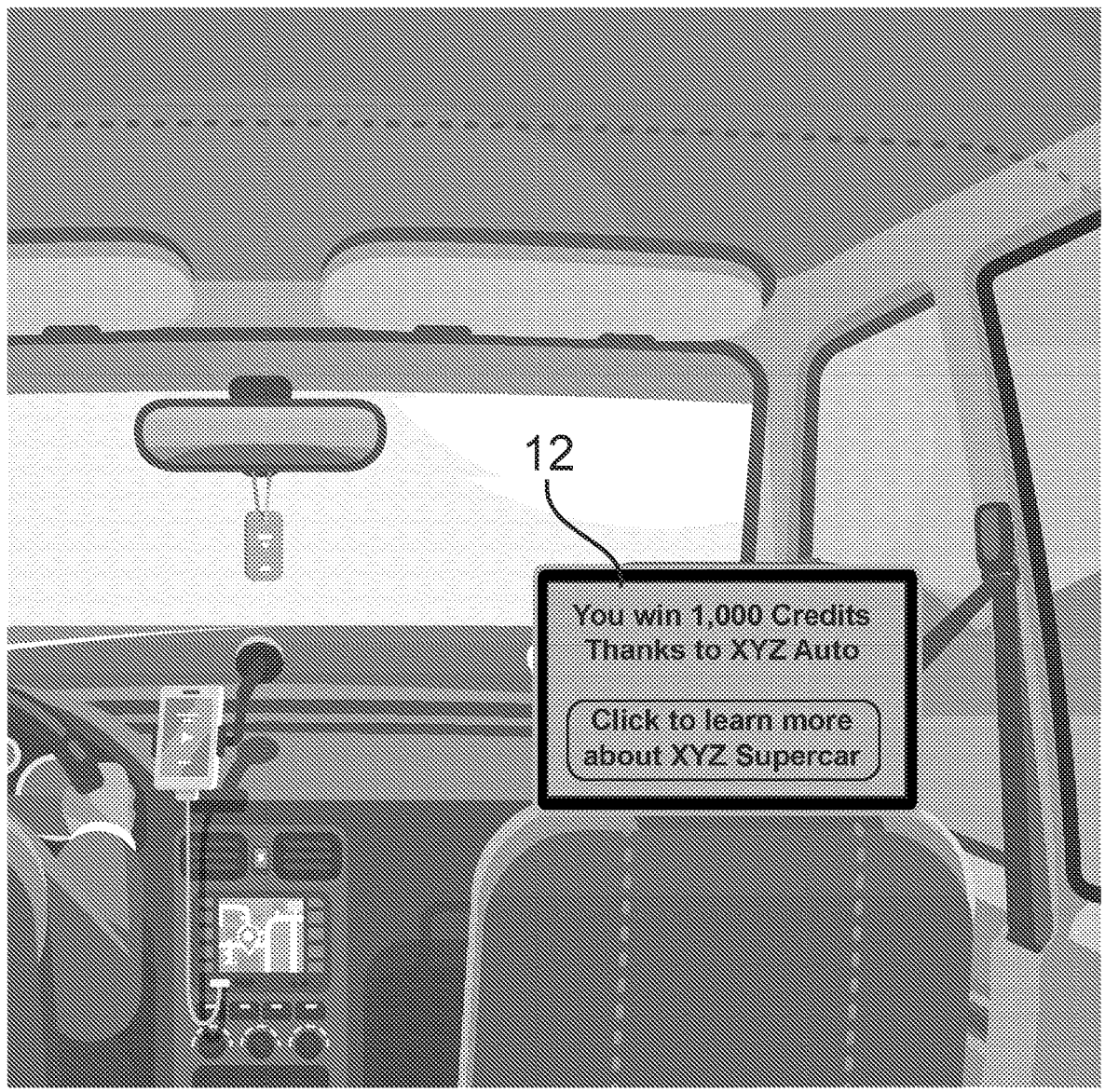
FIG. 32 is a perspective view of business computing device of a route advertisement/entertainment system operating a contest game for use in a ride share vehicle according to an embodiment.

In other embodiments, the system may be played as previously discussed, with individual hands being sponsored by other businesses as a form of advertising. For example, and without limitation, FIGS. 31 and 32 depict a hand sponsored by a business ("XYZ Auto"). In some embodiments, the earned credits may be doubled during the hand or other types of prizes for winning may be provided by the sponsoring business. As shown in FIG. 31, the sponsoring business is doubling the credits that can be won. Once the contest game is won by the passenger, the server 14 may be programmed to send for display an interactive user interface that depicts the credits won by the passenger along with advertising that the sponsoring business is the entity to thank for the double credits and further a selectable element to allow the passenger to select to view something offered from the sponsoring business, such as the example of "Click to learn more about XYZ Supercar."

Figure 33:
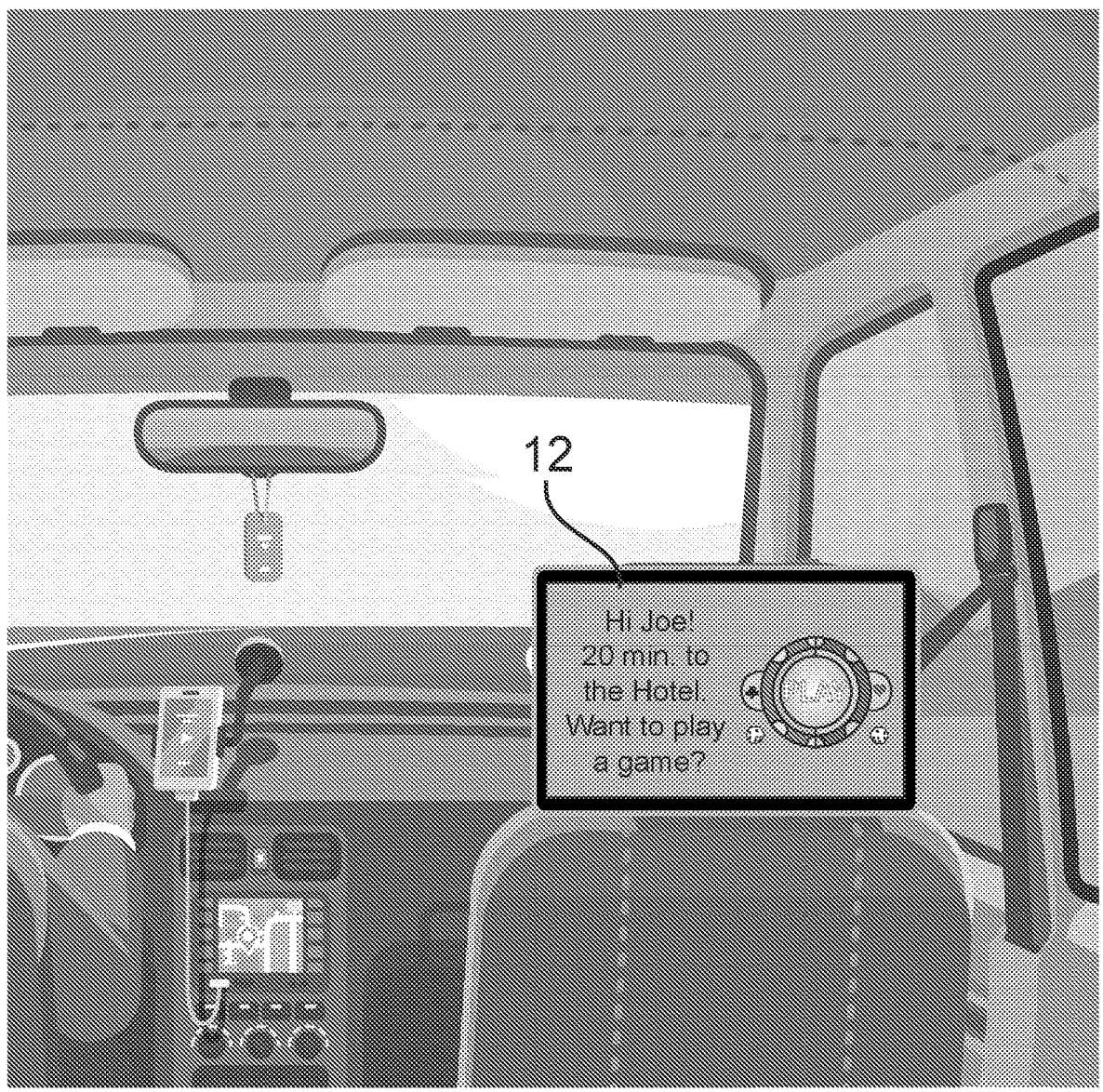
FIG. 33 is a perspective view of business computing device of a route advertisement/entertainment system operating a contest game for use in a ride share vehicle according to an embodiment.
Figure 34:
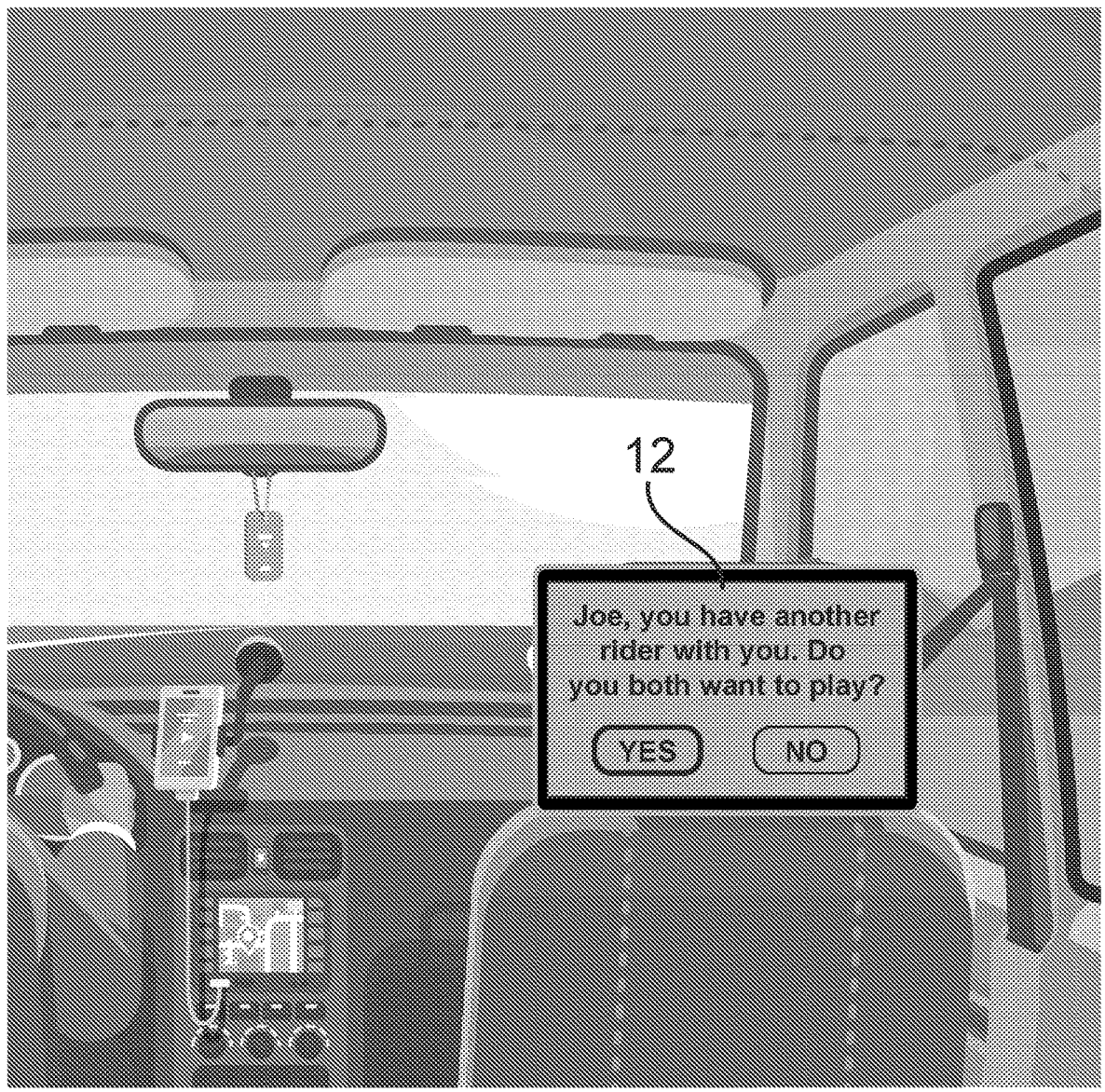
FIG. 34 is a perspective view of business computing device of a route advertisement/entertainment system operating a contest game for use in a ride share vehicle according to an embodiment.

In some embodiments, as shown in FIGS. 33-36, multiple riders in a ride share may engage and play the contest game. For example, the server 14 may be programmed to send for display on the business computing device 12 an interactive user interface with a request to engage with the system 10 during travel to the destination, as shown in FIG. 33. The business computing device 12 in FIG. 33 may display a greeting identifying the rider, the estimated time to the destination (i.e. 20 minutes to the Hotel) and a request to the passenger if the passenger wishes to engage with the system 10 by playing a game. The passenger may then select "play" (a positive acknowledgment) or nothing (a negative acknowledgment). If the user selects "play", the business computing device 12 sends a signal that indicates a positive acknowledgment to the server 14. The server 14 may be programmed to determine the number of passengers based on the ride share information an the requested number of riders that the passenger indicated. The server 14 may then be programmed to send an interactive user interface to the business computing device 12 depicting a request to the passenger indicating that another rider is present and requesting if both passengers wish to engage with the system 10 through a contest game, as shown in FIG. 34. The passenger may then select "yes" (a positive acknowledgment) or "no" (a negative acknowledgment). If the user selects "yes", the business computing device 12 sends a signal that indicates a positive acknowledgment to the server 14.

Figure 35:
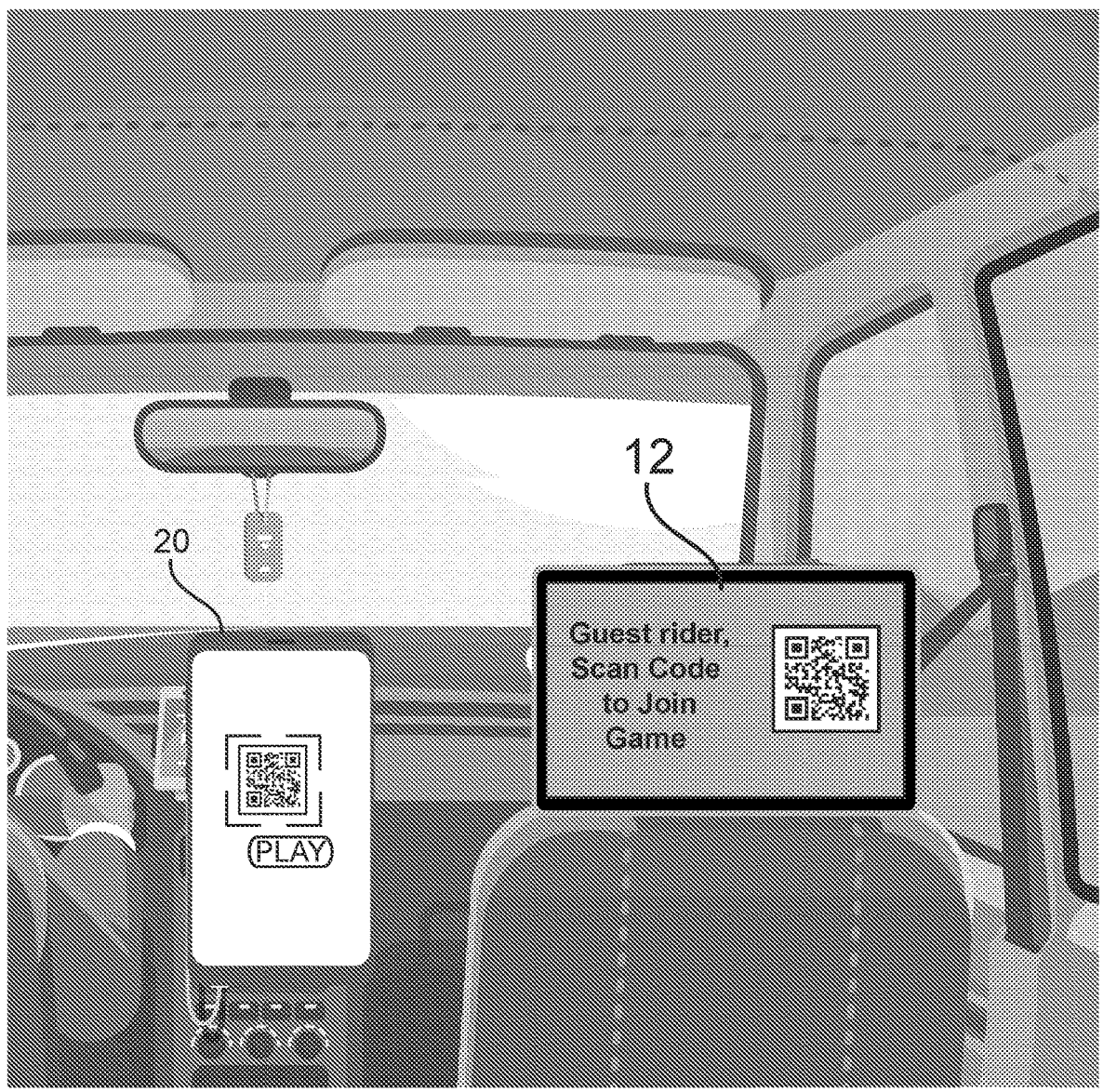
FIG. 35 is a perspective view of business computing device of a route advertisement/entertainment system operating a contest game for use in a ride share vehicle according to an embodiment.
Figure 36:
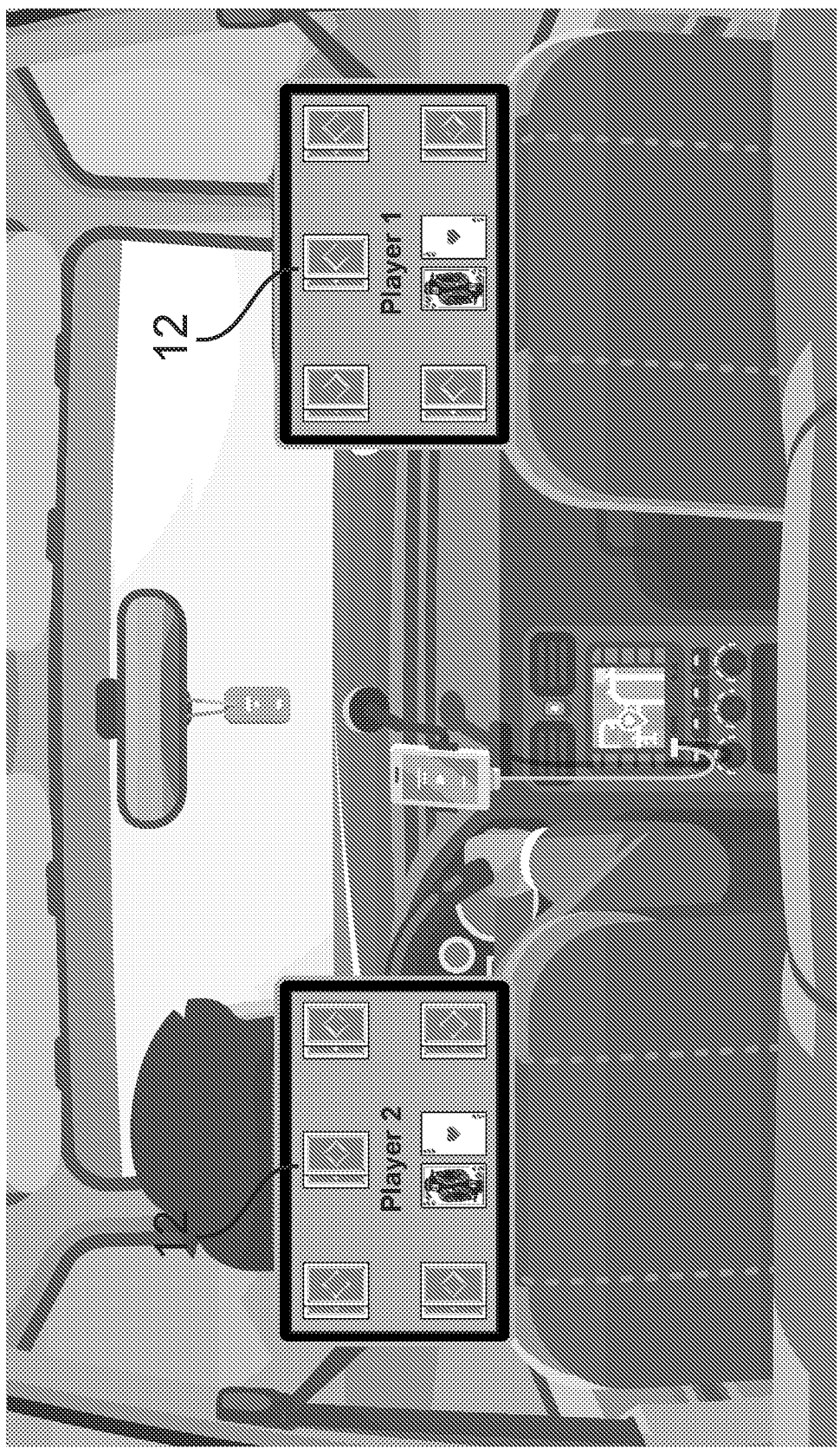
FIG. 36 is a perspective view of business computing device of a route advertisement/entertainment system operating a contest game for use in a ride share vehicle according to an embodiment.

Referring to FIG. 35, the serve 14 may be programmed, in response to receiving the positive acknowledgment of more than one player, to send for display on the business computing device 12, a scannable code allowing the rider to scan the code with his or her user computing device 12 and be joined to the game, playing the game with his or her phone, while the named passenger plays on the business computing device 12. In another embodiment, as shown in FIG. 36, the positive acknowledgment of more than one player will engage more than one business computing device 12 operating within the ride share vehicle to play a game. In at least these ways, more than one rider in a ride share may engage in the system to play a contest game.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A route advertisement/entertainment system for use in a ride share vehicle, the system comprising:
 a server having a memory storing user data, user content preferences and advertisement/entertainment data;
 a business computing device located within a ride share vehicle, the business computing device coupled to the server, wherein the server is programmed to:
  receive a signal from a ride share driver device, the signal including user data of the passenger that has been picked up and an indication that a ride to a destination has been initiated;
  establish a connection with the business computing device in response to receiving the signal from the ride share driver device and send for display on the business computing device an interactive user interface with a request to engage with the system during travel to the destination;
  receive a signal from the business computing device indicating a positive acknowledgment to engage with system;
  in response to receiving the positive acknowledgment, automatically access and process user content preferences corresponding to the user data and send for display on the business computing device an interactive user interface with a request to view content corresponding to the user content preferences and/or the destination; and
  in response to receiving a positive acknowledgment to view the content, automatically send, for display on the business computing device, content from advertisement/entertainment data associated with the content corresponding to the user content preferences and the destination.

2. The system of claim 1, wherein the content from advertisement/entertainment data is a video corresponding to the user content preferences and/or the destination.

3. The system of claim 1, wherein the content from advertisement/entertainment data is a topic information corresponding to the destination.

4. The system of claim 1, wherein the content from advertisement/entertainment data is an advertisement corresponding to the user content preferences and the destination.

5. The system of claim 4, wherein the advertisement comprises a coupon that is saved to the user data in response to selection of the coupon on the business computing device.

6. The system of claim 1, wherein the content from advertisement/entertainment data is an advertisement corresponding to the user content preferences.

7. The system of claim 6, wherein the advertisement comprises a coupon that is saved to the user data in response to selection of the coupon on the business computing device.

8. The system of claim 1, wherein the content from advertisement/entertainment data is a game corresponding to the user content preferences and/or the destination.

9. The system of claim 8, wherein the game comprises a real time game with players in other ride share vehicles.

10. A route advertisement/entertainment system for use in a ride share vehicle, the system comprising:

a server having a memory storing user data, user content preferences and advertisement/entertainment data, the advertisement/entertainment data being in a form of contest games information;

a business computing device located within a ride share vehicle, the business computing device coupled to the server, wherein the server is programmed to:

receive a signal from a ride share driver device, the signal including user data of the passenger that has been picked up and an indication that a ride to a destination has been initiated;

establish a connection with the business computing device in response to receiving the signal from the ride share driver device and send for display on the business computing device an interactive user interface with a request to engage with the system to play a contest game during travel to the destination;

receive a signal from the business computing device indicating a positive acknowledgment to engage with system to play the contest game;

in response to receiving the positive acknowledgment, automatically access and process user content preferences corresponding to the user data and send for display on the business computing device an interactive user interface with a request to select one of a plurality of selectable game elements, each element corresponding to a different game; and in response to receiving a positive acknowledgment of selecting one of the selectable game elements, automatically send, for display on the business computing device, a game for play on the business computer device; and in response to passenger winning the game through the business computing device sending for display on the business computing device an acknowledgment of winning and automatically applying credits to the user, wherein credits are exchangeable for goods and/or services.

\* \* \* \* \*